United States Patent
Yu et al.

(10) Patent No.: US 12,101,646 B2
(45) Date of Patent: Sep. 24, 2024

(54) REFERENCE SIGNAL TRANSMISSION METHOD AND DEVICE

(71) Applicant: HUAWEI TECHNOLOGIES CO., LTD., Shenzhen (CN)

(72) Inventors: Yingjie Yu, Shanghai (CN); Su Huang, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/669,668

(22) Filed: Feb. 11, 2022

(65) Prior Publication Data

US 2022/0167181 A1    May 26, 2022

Related U.S. Application Data

(63) Continuation of application No. PCT/CN2020/109148, filed on Aug. 14, 2020.

(30) Foreign Application Priority Data

Aug. 14, 2019    (CN) .......................... 201910748780.0

(51) Int. Cl.
     *H04W 16/28*      (2009.01)
     *H04L 5/00*      (2006.01)

(52) U.S. Cl.
     CPC ........... *H04W 16/28* (2013.01); *H04L 5/0051* (2013.01)

(58) Field of Classification Search
     CPC ..................................................... H04W 16/28
     See application file for complete search history.

(56) References Cited

U.S. PATENT DOCUMENTS

| | | | |
|---|---|---|---|
| 2010/0195566 A1* | 8/2010 | Krishnamurthy | H04L 5/0007 370/328 |
| 2017/0078062 A1* | 3/2017 | Park | H04L 27/2613 |
| 2018/0278314 A1* | 9/2018 | Nam | H04B 7/0413 |
| 2018/0368195 A1* | 12/2018 | Sugaya | H04W 24/02 |
| 2019/0044677 A1* | 2/2019 | Ly | H04B 7/088 |
| 2020/0053703 A1* | 2/2020 | Akkarakaran | G01S 1/20 |
| 2020/0107209 A1* | 4/2020 | Ratasuk | G01S 5/0236 |
| 2021/0176022 A1* | 6/2021 | Qi | H04L 5/02 |
| 2021/0250892 A1* | 8/2021 | Kim | H04L 5/0048 |

(Continued)

FOREIGN PATENT DOCUMENTS

| | | |
|---|---|---|
| CN | 105589506 A | 5/2016 |
| CN | 106559886 A | 4/2017 |

(Continued)

OTHER PUBLICATIONS

Chinese Office Action issued in corresponding Chinese Application No. 201910748780.0, dated Sep. 21, 2023, pp. 1-19.

(Continued)

*Primary Examiner* — Fahmida S Chowdhury
(74) *Attorney, Agent, or Firm* — HAUPTMAN HAM, LLP

(57) ABSTRACT

A signal transmission method includes receiving a first positioning reference signal (PRS) resource set, receiving a second PRS resource set, and determining that N first PRS resources in the first PRS resource set and N second PRS resources in the second PRS resource set satisfy a quasi-colocation (QCL) relationship, where N is an integer greater than or equal to 1.

20 Claims, 6 Drawing Sheets

(56) References Cited

U.S. PATENT DOCUMENTS

| | | | |
|---|---|---|---|
| 2021/0282111 A1* | 9/2021 | Yamada | G01S 5/10 |
| 2021/0297215 A1* | 9/2021 | Da | H04W 4/02 |
| 2021/0314045 A1* | 10/2021 | Cha | H04W 16/28 |
| 2022/0026517 A1* | 1/2022 | Hasegawa | G01S 13/74 |
| 2022/0038231 A1* | 2/2022 | Tao | H04L 5/0048 |
| 2022/0113365 A1* | 4/2022 | Sosnin | H04W 64/00 |
| 2022/0191817 A1* | 6/2022 | Michalopoulos | G01S 5/0236 |

FOREIGN PATENT DOCUMENTS

| | | |
|---|---|---|
| CN | 108288985 A | 7/2018 |
| CN | 109842470 A | 6/2019 |
| WO | 2016161963 A1 | 10/2016 |

OTHER PUBLICATIONS

Qualcomm Incorporated, Considerations on Phy-layer procedures for NR Positioning. 3GPP TSG RAN WG1 #97, Reno, USA, May 13-17, 2019, R1-1907299, 10 pages.

3GPP TS 36.211 V15.0.0 (Dec. 2017), 3rd Generation Partnership Project; Technical Specification Group Radio Access Network; Evolved Universal Terrestrial Radio Access (E-UTRA); Physical channels and modulation(Release 15), 220 bages.

3GPP TS 36.355 V15.3.0 (Mar. 2019), 3rd Generation Partnership Project; Technical Specification Group Radio Access Network; Evolved Universal Terrestrial Radio Access (E-UTRA); LTE Positioning Protocol (LPP)(Release 15), 223 pages.

3GPP TS 38.214 V15.4.0 (Dec. 2018), 3rd Generation Partnership Project; Technical Specification Group Radio Access Network; NR; Physical layer procedures for data(Release 15), 102 pages.

3GPP TS 38.305 V15.4.0 (Jun. 2019), 3rd Generation Partnership Project; Technical Specification Group Radio Access Network; NG Radio Access Network (NG-RAN); Stage 2 functional specification of User Equipment (UE) positioning in NG-RAN(Release 15), 72 pages.

3GPP TS 38.331 V15.4.0 (Dec. 2018), 3rd Generation Partnership Project; Technical Specification Group Radio Access Network; NR; Radio Resource Control (RRC) protocol specification(Release 15), 474 pages.

3GPP TR 38.855 V16.0.0 (Mar. 2019), 3rd Generation Partnership Project; Technical Specification Group Radio Access Network; Study on NR positioning support(Release 16), 197 pages.

Qualcomm Incorporated, OTDOA enhancements. 3GPP TSG RAN WG1 Meeting #86bis, Lisbon, Portugal Oct. 10-14, 2016, R1-1609996, 3 pages.

Ericsson, Qualcomm, WF on the multiple PRS time-frequency configurations. 3GPP TSG RAN WG1 Meeting #88, Athens, Greece, Feb. 13-17, 2017, R1-1703678, 3 pages.

International Search Report issued in corresponding International Application No. PCT/CN2020/109148, dated Oct. 27, 2020, pp. 1-11.

Intel Corporation: "On Radio-Layer Procedures for NR Positioning", 3GPP Draft; R1-1906824 / R1-1904322, May 1, 2019, XP051728275, total 11 pages.

Extended European Search Report issued in corresponding European Application No. 20853043.6, dated Jan. 9, 2024, pp. 1-8.

* cited by examiner

REFERENCE SIGNAL TRANSMISSION METHOD AND DEVICE

CROSS-REFERENCE TO RELATED APPLICATIONS

This application is a continuation of International Application No. PCT/CN2020/109148, filed on Aug. 14, 2020, which claims priority to Chinese Patent Application No. 201910748780.0, filed on Aug. 14, 2019. The disclosures of the aforementioned applications are hereby incorporated by reference in their entireties.

TECHNICAL FIELD

This application relates to the wireless communication field, and more specifically, to a signal transmission method and apparatus.

BACKGROUND

A quasi-colocation (quasi-colocation, QCL) (QCL may also be referred to as quasi co-location) relationship is introduced in long term evolution (long term evolution, LTE) coordinated multi-point (coordinated multi-point, CoMP). That two reference signals are in a QCL relationship for a large-scale parameter indicates that a large-scale parameter of one reference signal can be inferred from a large-scale parameter of the other reference signal, so that a terminal can assist in receiving one reference signal based on receiving information of the other reference signal. In an LTE system, no QCL relationship is configured between positioning reference signals (positioning reference signal, PRS).

However, there are a plurality of beams in a future 5th generation (5th generation, 5G) system or a new radio (new radio, NR) system, and a PRS may be sent on the plurality of beams. If no QCL relationship is configured between PRSs, a terminal device receives the positioning reference signal through beam sweeping, resulting in relatively high complexity.

SUMMARY

This application provides a signal transmission method and apparatus, a QCL relationship is configured between different PRSs, to help a terminal device determine a receive beam for a positioning reference signal. This can reduce overheads of performing receive beam sweeping by the terminal device, and save resources.

According to a first aspect, a signal transmission method is provided. The signal transmission method is performed by a terminal device, or is performed by a chip or a circuit disposed in the terminal device. This is not limited in this application. For ease of description, an example in which the terminal device performs the signal transmission method according to the first aspect is used below for description.

The signal transmission method includes:
receiving a first positioning reference signal PRS resource set; receiving a second PRS resource set; and determining that N first PRS resources in the first PRS resource set and N second PRS resources in the second PRS resource set satisfy a quasi-colocation QCL relationship, where N is an integer greater than or equal to 1.

It should be understood that the first PRS resource set and the second PRS resource set are different PRS resource sets, and correspond to different indexes. For example, an index of the first PRS resource set is "first PRS resource set #1", and an index of the second PRS resource set is "second PRS resource set #2".

According to the signal transmission method provided in this application, after receiving the first PRS resource set and the second PRS resource set, and learning that the N first PRS resources in the first PRS resource set and the N second PRS resources in the second PRS resource set satisfy the QCL relationship, the terminal device receives, by using a same receive beam, two PRSs corresponding to two PRS resources satisfying the QCL relationship. This helps the terminal device determine the receive beam for the positioning reference signal, and can reduce overheads of performing receive beam sweeping by the terminal device.

For example, the terminal device learns that a first PRS resource #1 in the first PRS resource set and a second PRS resource #1 in the second PRS resource set satisfy the QCL relationship, and the terminal device receives, by using a same receive beam, a PRS #1 and a PRS #2 respectively corresponding to the first PRS resource #1 and the second PRS resource #1, without separately performing receive beam sweeping for the PRS #1 and the PRS #2 to determine receive beams for the PRS #1 and the PRS #2.

With reference to the first aspect, in a possible implementation of the first aspect, the determining that N first PRS resources and N second PRS resources satisfy a quasi-colocation QCL relationship includes: determining that PRS resources having a same resource index in the N first PRS resources and the N second PRS resources satisfy the QCL relationship; or determining that PRS resources having a same resource position in the N first PRS resources and the N second PRS resources satisfy the QCL relationship; or determining that PRS resources having a specified QCL relationship in the N first PRS resources and the N second PRS resources satisfy the QCL relationship.

According to the signal transmission method provided in this application, that the terminal device determines that different PRS resources in different PRS resource sets satisfy the QCL relationship, based on indexes of the PRS resources in the different PRS resource sets or based on positions of the PRS resources in the different PRS resource sets. A plurality of feasible solutions are provided for the terminal device to determine that the PRS resources in the different PRS resource sets satisfy the QCL relationship.

For example, the terminal device learns, in the following three manners, that the first PRS resource #1 in the first PRS resource set and the second PRS resource #1 in the second PRS resource set satisfy the QCL relationship:

Manner 1:
The terminal device learns that indexes of the first PRS resource #1 and the second PRS resource #1 are the same, and are both "#1".

It should be understood that a manner of identifying the PRS resource in the PRS resource set is not limited in this embodiment of this application.

Manner 2:
The terminal device learns that a position of the first PRS resource #1 in the first PRS resource set is the same as a position of the second PRS resource #1 in the second PRS resource set. For example, the first PRS resource #1 is the first first PRS resource in the first PRS resource set, and the second PRS resource #1 is the first second PRS resource in the second PRS resource set.

Manner 3:
The terminal device learns, based on protocol presetting or a configuration of a network device, that the N first PRS resources in the first PRS resource set and the N second PRS resources in the second PRS resource set have a specified QCL relationship. For example, the terminal device learns, based on the protocol presetting or the configuration of the network device, that the first PRS resource #1 in the first PRS resource set and a second PRS resource #3 in the second PRS resource set have the specified QCL relationship. Alternatively, the terminal device learns, based on the protocol presetting or the configuration of the network device, that the first PRS resource #1 in the first PRS resource set and the second PRS resource #3 in the second PRS resource set have the specified QCL relationship, and a first PRS resource #2 in the first PRS resource set and a second PRS resource #5 in the second PRS resource set have the specified QCL relationship.

With reference to the first aspect, in a possible implementation of the first aspect, the determining that N first PRS resources and N second PRS resources satisfy a quasi-colocation QCL relationship includes: determining, based on a QCL-related parameter, that the N first PRS resources and the N second PRS resources satisfy the quasi-colocation QCL relationship, where the QCL-related parameter includes one or more of the following parameters: a QCL type, the index of the first PRS resource set, and the index of the second PRS resource set; and a part or all of the QCL-related parameter is preset; or a part or all of the QCL-related parameter is configured by the network device.

According to the signal transmission method provided in this application, the terminal device can learn, based on presetting and/or the QCL-related parameter configured by the network device, that the N first PRS resources and the N second PRS resources satisfy the quasi-colocation QCL relationship. A flexible solution is provided for the terminal device to learn of the QCL-related parameter used to determine that the PRS resources in the different PRS resource sets satisfy the QCL relationship.

For example, the terminal device learns of the QCL-related parameter in the following several manners:

Manner 1:

All of the QCL-related parameter is preset, for example, pre-defined in a protocol. In this manner, the terminal device and the network device may learn of the QCL-related parameter based on the protocol.

Manner 2:

All of the QCL-related parameter is configured by the network device.

Manner 3:

A part of the QCL-related parameter is preset, and a parameter that is not preset in the QCL-related parameter is configured by the network device.

It should be understood that "preset" in this application includes pre-definition, for example, protocol definition. "Pre-definition" may be implemented by prestoring corresponding code or a corresponding table in a device (for example, including the terminal device and the network device), or in another manner that may be used to indicate related information. A specific implementation is not limited in this application.

With reference to the first aspect, in a possible implementation of the first aspect, the QCL-related parameter further includes: indexes of the N first PRS resources and indexes of the N second PRS resources.

According to the signal transmission method provided in this application, the QCL-related parameter further includes the indexes of the PRS resources in the different PRS resource sets, so that the terminal device can further determine, based on the indexes of the PRS resources, that the different PRS resources satisfy the QCL relationship, to improve accuracy of determining, by the terminal device, that the PRS resources in the different PRS resource sets satisfy the QCL relationship.

With reference to the first aspect, in a possible implementation of the first aspect, when the part or all of the QCL-related parameter is configured by the network device, the signal transmission method further includes: receiving a configuration parameter, where the configuration parameter includes the part or all of the QCL-related parameter.

According to the signal transmission method provided in this application, the terminal device learns that the QCL-related parameter may be configured by the network device, so that a feasible solution is provided for the terminal device to learn of the QCL-related parameter.

With reference to the first aspect, in a possible implementation of the first aspect, the configuration parameter is carried in long term evolution positioning protocol LPP signaling.

According to the signal transmission method provided in this application, the foregoing configuration parameter is sent to the terminal device by using the long term evolution positioning protocol (long term evolution position protocol, LPP) signaling. The signaling in an existing protocol is reused, so that resources can be saved.

With reference to the first aspect, in a possible implementation of the first aspect, the QCL type includes at least one of the following types: a QCL type A, a QCL type D, QCL types A+D, a QCL type C, or QCL types C+D.

According to the signal transmission method provided in this application, there are a plurality of possibilities of the QCL type, so that solution flexibility is improved.

With reference to the first aspect, in a possible implementation of the first aspect, the first PRS resource set includes M first PRS resources, and the M first PRS resources sequentially correspond one-to-one to M transmit beams; and the second PRS resource set includes M second PRS resources, and the M second PRS resources sequentially correspond one-to-one to the M transmit beams, where M is an integer greater than or equal to N.

According to the signal transmission method provided in this application, a quantity of PRS resources included in the first PRS resource set is the same as a quantity of PRS resources included in the first PRS resource set, and a beam used to send the PRS resource in the first PRS resource set is the same as a beam used to send the PRS resource in the second PRS resource set. Therefore, when the terminal device does not learn of the indexes of the N first PRS resources and the indexes of the N second PRS resources, the terminal device can determine, based on the index of the first PRS resource set and the index of the second PRS resource set, that the PRS resources included in the first PRS resource set correspond one-to-one to the PRS resources included in the second PRS resource set.

With reference to the first aspect, in a possible implementation of the first aspect, resource elements REs occupied by the first PRS resource in the first PRS resource set and the second PRS resource in the second PRS resource set all or partially overlap, where the first PRS resource and the second PRS resource satisfy the QCL relationship.

According to the signal transmission method provided in this application, that different PRS resources occupying all or partially overlapping resource elements (resource element, RE) satisfy the QCL relationship includes: The different PRS resources naturally satisfy the QCL relationship because the occupied REs all or partially overlap; or that the different PRS resources satisfy the QCL relationship is determined by using the foregoing method for determining that the different PRS resources satisfy the QCL relationship.

According to a second aspect, a signal transmission method is provided. The signal transmission method is performed by a network device, or is performed by a chip or a circuit disposed in the network device. This is not limited in this application. The network device in the embodiments of this application includes a location management component (location management component, LMC), a location management function (location management function, LMF), or another device that can implement a function of the LMC or the LMF in the embodiments of this application. For ease of description, an example in which the network device performs the signal transmission method according to the second aspect is used below for description.

The signal transmission method includes:

determining that N first PRS resources in a first PRS resource set and N second PRS resources in a second PRS resource set satisfy a quasi-colocation QCL relationship, where N is an integer greater than or equal to 1; sending the first positioning reference signal PRS resource set;

and sending the second PRS resource set.

According to the signal transmission method provided in this application, before sending the first PRS resource set and the second PRS resource set, the network device can learn that the N first PRS resources in the first PRS resource set and the N second PRS resources in the second PRS resource satisfy the QCL relationship, so that the network device can send, by using a same transmit beam, two PRSs corresponding to two PRS resources satisfying the QCL relationship. This helps the network device determine the transmit beam for the positioning reference signal.

With reference to the second aspect, in a possible implementation of the second aspect, the determining that N first PRS resources and N second PRS resources satisfy a quasi-colocation QCL relationship includes: determining that PRS resources having a same resource index in the N first PRS resources and the N second PRS resources satisfy the QCL relationship; or determining that PRS resources having a same resource position in the N first PRS resources and the N second PRS resources satisfy the QCL relationship; or determining that PRS resources having a specified QCL relationship in the N first PRS resources and the N second PRS resources satisfy the QCL relationship.

According to the signal transmission method provided in this application, that the network device determines that PRS resources in different PRS resource sets satisfy the QCL relationship, based on indexes of the PRS resources in the different PRS resource sets or based on positions of the PRS resources in the different PRS resource sets. A plurality of feasible solutions are provided for the network device to determine that the PRS resources in the different PRS resource sets satisfy the QCL relationship.

For example, the network device learns, in the following three manners, that the first PRS resource #1 in the first PRS resource set and the second PRS resource #1 in the second PRS resource set satisfy the QCL relationship:

Manner 1:

The network device learns that indexes of the first PRS resource #1 and the second PRS resource #1 are the same, and are both "#1".

It should be understood that a manner of identifying the PRS resource in the PRS resource set is not limited in this embodiment of this application.

Manner 2:

The network device learns that a position of the first PRS resource #1 in the first PRS resource set is the same as a position of the second PRS resource #1 in the second PRS resource set. For example, the first PRS resource #1 is the first first PRS resource in the first PRS resource set, and the second PRS resource #1 is the first second PRS resource in the second PRS resource set.

Manner 3:

The network device learns, based on protocol presetting or through direct configuration, that the N first PRS resources in the first PRS resource set and the N second PRS resources in the second PRS resource set have a specified QCL relationship. For example, the network device learns, based on the protocol presetting or through the direct configuration, that the first PRS resource #1 in the first PRS resource set and a second PRS resource #3 in the second PRS resource set have the specified QCL relationship. Alternatively, the network device learns, based on the protocol presetting or through the direct configuration, that the first PRS resource #1 in the first PRS resource set and the second PRS resource #3 in the second PRS resource set have the specified QCL relationship, and a first PRS resource #2 in the first PRS resource set and a second PRS resource #5 in the second PRS resource set have the specified QCL relationship. With reference to the second aspect, in a possible implementation of the second aspect, the determining that N first PRS resources and N second PRS resources satisfy a quasi-colocation QCL relationship includes: determining, based on a QCL-related parameter, that the N first PRS resources and the N second PRS resources satisfy the quasi-colocation QCL relationship, where the QCL-related parameter includes one or more of the following parameters: a QCL type, an index of the first PRS resource set, and an index of the second PRS resource set; and a part or all of the QCL-related parameter is preset; or a part or all of the QCL-related parameter is configured by the network device.

According to the signal transmission method provided in this application, the network device can learn, based on presetting and/or the QCL-related parameter configured by the network device, that the N first PRS resources and the N second PRS resources satisfy the quasi-colocation QCL relationship. A flexible solution is provided for the network device to learn of the QCL-related parameter used to determine that the PRS resources in the different PRS resource sets satisfy the QCL relationship.

For example, the network device learns of the QCL-related parameter in the following several manners:

Manner 1:

All of the QCL-related parameter is preset, for example, pre-defined in a protocol. In this manner, a terminal device and the network device may learn of the QCL-related parameter based on the protocol.

Manner 2:

All of the QCL-related parameter is configured by the network device. The network device can naturally learn of the QCL-related parameter configured by the network device.

Manner 3:

A part of the QCL-related parameter is preset, and a parameter that is not preset in the QCL-related parameter is configured by the network device.

With reference to the second aspect, in a possible implementation of the second aspect, the QCL-related parameter further includes: indexes of the N first PRS resources and indexes of the N second PRS resources.

According to the signal transmission method provided in this application, the QCL-related parameter further includes the indexes of the PRS resources in the different PRS resource sets, so that the network device can further determine, based on the indexes of the PRS resources, that the different PRS resources satisfy the QCL relationship, to improve accuracy of determining, by the network device, that the PRS resources in the different PRS resource sets satisfy the QCL relationship.

With reference to the second aspect, in a possible implementation of the second aspect, when the part or all of the QCL-related parameter is configured by the network device, the signal transmission method further includes: sending a configuration parameter, where the configuration parameter includes the part or all of the QCL-related parameter.

According to the signal transmission method provided in this application, the network device can send the QCL-related parameter to the terminal device, so that a feasible solution is provided for the terminal device to learn of the QCL-related parameter.

With reference to the second aspect, in a possible implementation of the second aspect, the configuration parameter is carried in long term evolution positioning protocol LPP signaling.

According to the signal transmission method provided in this application, the foregoing configuration parameter is sent to the terminal device by using the LPP signaling. The signaling in an existing protocol is reused, so that resources can be saved.

With reference to the second aspect, in a possible implementation of the second aspect, the QCL type includes at least one of the following types: a QCL type A, a QCL type D, QCL types A+D, a QCL type C, or QCL types C+D.

According to the signal transmission method provided in this application, there are a plurality of possibilities of the QCL type, so that solution flexibility is improved.

With reference to the second aspect, in a possible implementation of the second aspect, the first PRS resource set includes M first PRS resources, and the M first PRS resources sequentially correspond one-to-one to M transmit beams; and the second PRS resource set includes M second PRS resources, and the M second PRS resources sequentially correspond one-to-one to the M transmit beams, where M is an integer greater than or equal to N.

According to the signal transmission method provided in this application, a quantity of PRS resources included in the first PRS resource set is the same as a quantity of PRS resources included in the first PRS resource set, and a beam used to send the PRS resource in the first PRS resource set is the same as a beam used to send the PRS resource in the second PRS resource set. Therefore, when the network device does not learn of the indexes of the N first PRS resources and the indexes of the N second PRS resources, the network device can determine, based on the index of the first PRS resource set and the index of the second PRS resource set, that the PRS resources included in the first PRS resource set correspond one-to-one to the PRS resources included in the second PRS resource set.

With reference to the second aspect, in a possible implementation of the second aspect, resource elements REs occupied by the first PRS resource in the first PRS resource set and the second PRS resource in the second PRS resource set all or partially overlap, where the first PRS resource and the second PRS resource satisfy the QCL relationship.

According to the signal transmission method provided in this application, that different PRS resources occupying all or partially overlapping resource elements (resource element, RE) satisfy the QCL relationship includes: The different PRS resources naturally satisfy the QCL relationship because the occupied REs all or partially overlap; or that the different PRS resources satisfy the QCL relationship is determined by using the foregoing method for determining that the different PRS resources satisfy the QCL relationship.

According to a third aspect, a signal transmission apparatus is provided. The signal transmission apparatus includes a processor, configured to implement a function of the terminal device in the method described in the first aspect.

For example, the signal transmission apparatus further includes a memory, the memory is coupled to the processor, and the processor is configured to implement the function of the terminal device in the method described in the first aspect.

In a possible implementation, the memory is configured to store program instructions and data. The memory is coupled to the processor, and the processor may invoke and execute the program instructions stored in the memory, to implement the function of the terminal device in the method described in the first aspect.

For example, the signal transmission apparatus further includes a communication interface, and the communication interface is used by the signal transmission apparatus to communicate with another device. When the signal transmission apparatus is a terminal device, the communication interface includes a transceiver, or the communication interface includes an input/output interface.

In a possible design, the signal transmission apparatus includes a processor and a communication interface, to implement a function of the terminal device in the method described in the first aspect. Details are as follows:

The communication interface is used by the processor to perform external communication.

The processor is configured to run a computer program, so that the apparatus implements the method described in the first aspect.

It may be understood that the external communication may be communication with an object other than the processor, or an object other than the apparatus.

In another implementation, when the signal transmission apparatus is a chip or a chip system, the communication interface includes an input/output interface, an interface circuit, an output circuit, an input circuit, a pin, a related circuit, or the like in the chip or the chip system. The processor is embodied as a processing circuit or a logic circuit.

According to a fourth aspect, a signal transmission apparatus is provided. The signal transmission apparatus includes a processor, configured to implement a function of the network device in the method described in the second aspect.

For example, the signal transmission apparatus further includes a memory, the memory is coupled to the processor, and the processor is configured to implement the function of the network device in the method described in the second aspect.

In a possible implementation, the memory is configured to store program instructions and data. The memory is coupled to the processor, and the processor may invoke and execute the program instructions stored in the memory, to implement the function of the network device in the method described in the second aspect.

For example, the signal transmission apparatus further includes a communication interface, and the communication interface is used by the signal transmission apparatus to communicate with another device. When the signal transmission apparatus is a network device, the communication interface is a transceiver, an input/output interface, a circuit, or the like.

In a possible design, the signal transmission apparatus includes a processor and a communication interface, to implement a function of the network device in the method described in the first aspect. Details are as follows:

The communication interface is used by the processor to perform external communication.

The processor is configured to run a computer program, so that the apparatus implements the method described in the second aspect.

It may be understood that the external communication may be communication with an object other than the processor, or an object other than the apparatus.

In another possible design, the signal transmission apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a fifth aspect, a signal transmission method is provided. The signal transmission method is performed by a terminal device, or is performed by a chip or a circuit disposed in the terminal device. This is not limited in this application. For ease of description, an example in which the terminal device performs the signal transmission method according to the fifth aspect is used below for description.

The signal transmission method includes:

receiving first configuration information, and obtaining a first positioning reference signal PRS resource set based on the first configuration information;

receiving second configuration information, and obtaining a second PRS resource set based on the second configuration information; and determining that a first PRS resource in the first PRS resource set and a second PRS resource in the second PRS resource set satisfy a quasi-colocation QCL relationship.

With reference to the fifth aspect, in a possible implementation of the fifth aspect, that the first PRS resource and the second PRS resource have at least one of the following correspondences includes:

the first PRS resource and the second PRS resource have a same resource index;

the first PRS resource and the second PRS resource have a same resource position; and the first PRS resource and the second PRS resource have a specified QCL relationship.

With reference to the fifth aspect, in a possible implementation of the fifth aspect, the determining that a first PRS resource and a second PRS resource satisfy a quasi-colocation QCL relationship includes:

determining, based on a QCL-related parameter, that the first PRS resource and the second PRS resource satisfy the quasi-colocation QCL relationship, where the QCL-related parameter includes one or more of the following parameters:

a QCL type, an index of the first PRS resource set, and an index of the second PRS resource set; and a part or all of the QCL-related parameter is preset; or a part or all of the QCL-related parameter is configured by a network device.

With reference to the fifth aspect, in a possible implementation of the fifth aspect, the QCL-related parameter further includes:

an index of the first PRS resource and an index of the second PRS resource.

With reference to the fifth aspect, in a possible implementation of the fifth aspect, when the part or all of the QCL-related parameter is configured by the network device, the method further includes: receiving a configuration parameter, where the configuration parameter includes the part or all of the QCL-related parameter.

With reference to the fifth aspect, in a possible implementation of the fifth aspect, the configuration parameter is carried in long term evolution positioning protocol LPP signaling.

With reference to the fifth aspect, in a possible implementation of the fifth aspect, the QCL type includes at least one of the following types:

a QCL type A, a QCL type D, QCL types A+D, a QCL type C, or QCL types C+D.

With reference to the fifth aspect, in a possible implementation of the fifth aspect, the first PRS resource set includes M first PRS resources, and the M first PRS resources sequentially correspond one-to-one to M transmit beams; and the second PRS resource set includes M second PRS resources, and the M second PRS resources sequentially correspond one-to-one to the M transmit beams, where M is an integer greater than or equal to N.

With reference to the fifth aspect, in a possible implementation of the fifth aspect, resource elements REs occupied by the first PRS resource in the first PRS resource set and the second PRS resource in the second PRS resource set all or partially overlap, where the first PRS resource and the second PRS resource satisfy the QCL relationship; and that the first PRS resource and the second PRS resource satisfy the QCL relationship includes: that the first PRS resource and the second PRS resource satisfy the QCL relationship is preset; or that the first PRS resource and the second PRS resource satisfy the QCL relationship is determined based on the QCL-related parameter.

For technical effects and detailed explanations of any one of the fifth aspect and the possible implementations of the fifth aspect, refer to descriptions of any one of the first aspect and the possible implementations of the first aspect. Any one of the fifth aspect and the possible implementations of the fifth aspect may be considered as a special case of any one of the first aspect and the possible implementations of the first aspect, and details are not described herein again.

According to a sixth aspect, a signal transmission method is provided. The signal transmission method is performed by a network device, or is performed by a chip or a circuit disposed in the network device. This is not limited in this application. For ease of description, an example in which the network device performs the signal transmission method according to the fifth aspect is used below for description.

The signal transmission method includes:

determining that a first PRS resource in a first positioning reference signal PRS resource set and a second PRS resource in a second PRS resource set satisfy a quasi-colocation QCL relationship;

sending first configuration information, where the first configuration information is used to indicate the first PRS resource set; and sending second configuration information, where the second configuration information is used to indicate the second PRS resource set.

With reference to the sixth aspect, in a possible implementation of the sixth aspect, that the first PRS resource and the second PRS resource have at least one of the following correspondences includes:

the first PRS resource and the second PRS resource have a same resource index;

the first PRS resource and the second PRS resource have a same resource position; and the first PRS resource and the second PRS resource have a specified QCL relationship.

With reference to the sixth aspect, in a possible implementation of the sixth aspect, the determining that a first PRS resource and a second PRS resource satisfy a quasi-colocation QCL relationship includes:

determining, based on a QCL-related parameter, that the first PRS resource and the second PRS resource satisfy the quasi-colocation QCL relationship, where the QCL-related parameter includes one or more of the following parameters:

a QCL type, an index of the first PRS resource set, and an index of the second PRS resource set; and a part or all of the QCL-related parameter is preset; or a part or all of the QCL-related parameter is configured by the network device.

With reference to the sixth aspect, in a possible implementation of the sixth aspect, the QCL-related parameter further includes:

an index of the first PRS resource and an index of the second PRS resource.

With reference to the sixth aspect, in a possible implementation of the sixth aspect, when the part or all of the QCL-related parameter is configured by the network device, the method further includes: sending a configuration parameter, where the configuration parameter includes the part or all of the QCL-related parameter.

With reference to the fifth aspect, in a possible implementation of the sixth aspect, the configuration parameter is carried in long term evolution positioning protocol LPP signaling.

With reference to the sixth aspect, in a possible implementation of the sixth aspect, the QCL type includes at least one of the following types:

a QCL type A, a QCL type D, QCL types A+D, a QCL type C, or QCL types C+D.

With reference to the sixth aspect, in a possible implementation of the sixth aspect, the first PRS resource set includes M first PRS resources, and the M first PRS resources sequentially correspond one-to-one to M transmit beams; and the second PRS resource set includes M second PRS resources, and the M second PRS resources sequentially correspond one-to-one to the M transmit beams, where M is an integer greater than or equal to N.

With reference to the sixth aspect, in a possible implementation of the sixth aspect, resource elements REs occupied by the first PRS resource in the first PRS resource set and the second PRS resource in the second PRS resource set all or partially overlap, where the first PRS resource and the second PRS resource satisfy the QCL relationship; and that the first PRS resource and the second PRS resource satisfy the QCL relationship includes: that the first PRS resource and the second PRS resource satisfy the QCL relationship is preset; or that the first PRS resource and the second PRS resource satisfy the QCL relationship is determined based on the QCL-related parameter.

For technical effects and detailed explanations of any one of the sixth aspect and the possible implementations of the sixth aspect, refer to descriptions of any one of the second aspect and the possible implementations of the second aspect. Any one of the sixth aspect and the possible implementations of the sixth aspect may be considered as a special case of any one of the second aspect and the possible implementations of the second aspect, and details are not described herein again.

According to a seventh aspect, a signal transmission apparatus is provided. The signal transmission apparatus includes a processor, configured to implement a function of the terminal device in the method described in the fifth aspect.

For example, the signal transmission apparatus further includes a memory, the memory is coupled to the processor, and the processor is configured to implement the function of the terminal device in the method described in the fifth aspect.

In a possible implementation, the memory is configured to store program instructions and data. The memory is coupled to the processor, and the processor may invoke and execute the program instructions stored in the memory, to implement the function of the terminal device in the method described in the fifth aspect.

For example, the signal transmission apparatus further includes a communication interface, and the communication interface is used by the signal transmission apparatus to communicate with another device. When the signal transmission apparatus is a terminal device, the communication interface includes a transceiver, or the communication interface includes an input/output interface.

In a possible design, the signal transmission apparatus includes a processor and a communication interface, to implement a function of the terminal device in the method described in the fifth aspect. Details are as follows:

The communication interface is used by the processor to perform external communication.

The processor is configured to run a computer program, so that the apparatus implements the method described in the fifth aspect.

It may be understood that the external communication may be communication with an object other than the processor, or an object other than the apparatus.

In another implementation, when the signal transmission apparatus is a chip or a chip system, the communication interface includes an input/output interface, an interface circuit, an output circuit, an input circuit, a pin, a related circuit, or the like in the chip or the chip system. The processor is embodied as a processing circuit or a logic circuit.

According to an eighth aspect, a signal transmission apparatus is provided. The signal transmission apparatus includes a processor, configured to implement a function of the network device in the method described in the sixth aspect.

For example, the signal transmission apparatus further includes a memory, the memory is coupled to the processor, and the processor is configured to implement the function of the network device in the method described in the sixth aspect.

In a possible implementation, the memory is configured to store program instructions and data. The memory is coupled to the processor, and the processor may invoke and execute the program instructions stored in the memory, to implement the function of the network device in the method described in the sixth aspect.

For example, the signal transmission apparatus further includes a communication interface, and the communication interface is used by the signal transmission apparatus to communicate with another device. When the signal transmission apparatus is a network device, the communication interface is a transceiver, an input/output interface, a circuit, or the like.

In a possible design, the signal transmission apparatus includes a processor and a communication interface, to implement a function of the network device in the method described in the sixth aspect. Details are as follows:

The communication interface is used by the processor to perform external communication.

The processor is configured to run a computer program, so that the apparatus implements the method described in the sixth aspect.

It may be understood that the external communication may be communication with an object other than the processor, or an object other than the apparatus.

In another possible design, the signal transmission apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a ninth aspect, a computer-readable storage medium is provided. The computer-readable storage medium stores a computer program. When the computer program is executed by a communication apparatus, the communication apparatus is enabled to implement the method according to any one of the first aspect and the possible implementations of the first aspect.

According to a tenth aspect, a computer-readable storage medium is provided. The computer-readable storage medium stores a computer program. When the computer program is executed by a communication apparatus, the communication apparatus is enabled to implement the method according to any one of the second aspect and the possible implementations of the second aspect.

According to an eleventh aspect, a computer-readable storage medium is provided. The computer-readable storage medium stores a computer program. When the computer program is executed by a communication apparatus, the communication apparatus is enabled to implement the method according to any one of the fifth aspect and the possible implementations of the fifth aspect.

According to a twelfth aspect, a computer-readable storage medium is provided. The computer-readable storage medium stores a computer program. When the computer program is executed by a communication apparatus, the communication apparatus is enabled to implement the method according to any one of the sixth aspect and the possible implementations of the sixth aspect.

According to a thirteenth aspect, a computer program product including instructions is provided. When the instructions are executed by a computer, a communication apparatus is enabled to implement the method according to any one of the first aspect and the third aspect and the possible implementations of the first aspect.

According to a fourteenth aspect, a computer program product including instructions is provided. When the instructions are executed by a computer, a communication apparatus is enabled to implement the method according to any one of the second aspect and the possible implementations of the second aspect.

According to a fifteenth aspect, a computer program product including instructions is provided. When the instructions are executed by a computer, a communication apparatus is enabled to implement the method according to any one of the fifth aspect and the possible implementations of the fifth aspect.

According to a sixteenth aspect, a computer program product including instructions is provided. When the instructions are executed by a computer, a communication apparatus is enabled to implement the method according to any one of the sixth aspect and the possible implementations of the sixth aspect.

According to a seventeenth aspect, a positioning system is provided. The positioning system includes the signal transmission apparatus shown in the third aspect and the signal transmission apparatus shown in the fourth aspect, or includes the signal transmission apparatus shown in the seventh aspect and the signal transmission apparatus shown in the eighth aspect.

The positioning system according to the seventeenth aspect further includes a serving cell, a neighboring cell, and the like.

Based on the foregoing descriptions, the signal transmission method and apparatus provided in this application helps a terminal device determine a receive beam for a positioning reference signal, and can reduce overheads of performing receive beam sweeping by the terminal device. The solutions provided in this application may be applied to a scenario in which a terminal device is positioned based on distances from the terminal device to a plurality of base stations, or may be applied to another scenario in which that different PRSs satisfy a QCL relationship needs to be obtained.

DESCRIPTION OF EMBODIMENTS

Figure 1:
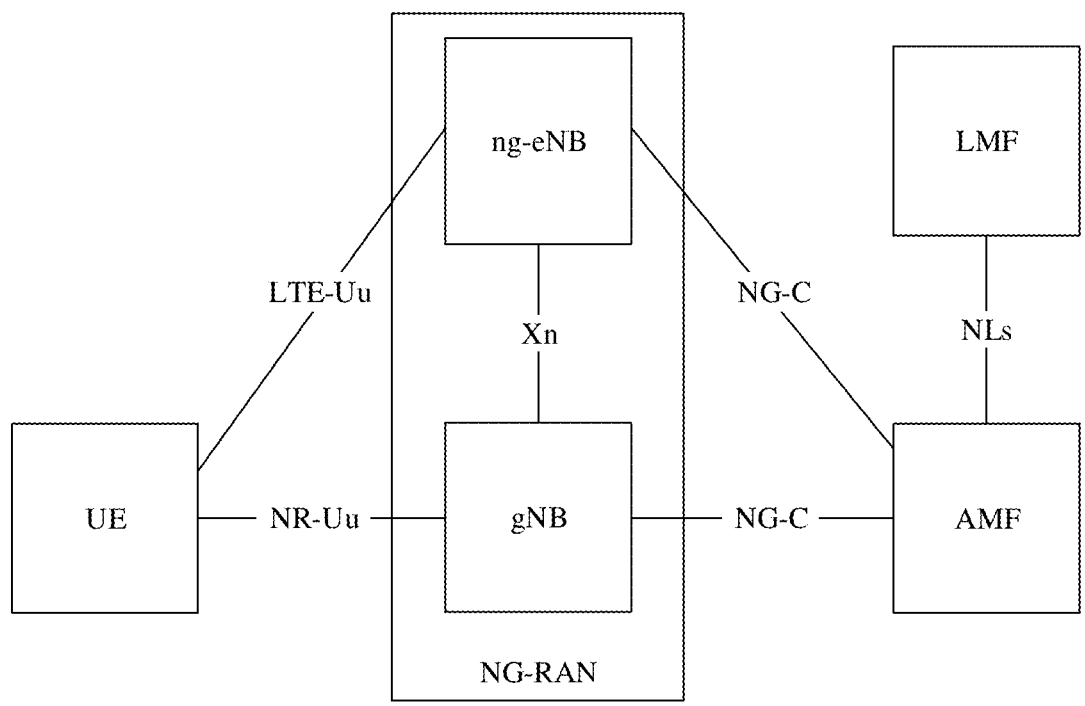
FIG. 1 is a schematic diagram of an architecture of a positioning system to which signal transmission according to an embodiment of this application is applied.

The following describes technical solutions in this application with reference to the accompanying drawings.

The technical solutions in the embodiments of this application may be applied to various communication systems, such as a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communication system, a future 5th generation (5th generation, 5G) system, or a new radio (new radio, NR) system. A 5G mobile communication system in this application includes a non-standalone (non-standalone, NSA) 5G mobile communication system or a standalone (standalone, SA) 5G mobile communication system. The technical solutions provided in this application may be further applicable to future communication systems, for example, a 6th generation mobile communication system. Alternatively, the communication system may be a public land mobile network (Public Land Mobile Network, PLMN), a device-to-device (device-to-device, D2D) communication system, a machine to machine (machine to machine, M2M) communication system, an internet of things (Internet of Things, IoT) communication system, or another communication system.

A terminal device (terminal equipment) in the embodiments of this application may be an access terminal, a subscriber unit, a subscriber station, a mobile station, a relay station, a remote station, a remote terminal, a mobile device, a user terminal (user terminal), user equipment (user equipment, UE), a terminal (terminal), a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, a terminal device in a future evolved public land mobile network (public land mobile network, PLMN), a terminal device in a future internet of vehicles, or the like. This is not limited in the embodiments of this application.

By way of example, and not limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of the user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

In addition, the terminal device in the embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In the embodiments of this application, an IoT technology may implement massive connections, deep coverage, and terminal power saving by using, for example, a narrowband (narrow band, NB) technology.

In addition, in the embodiments of this application, the terminal device may further include a sensor, for example, an intelligent printer, a train detector, or a gas station. Main functions of the terminal device include collecting data (for some terminal devices), receiving control information and downlink data from a network device, sending an electromagnetic wave, and sending uplink data to a network device.

A network device in the embodiments of this application may be any communication device that has wireless sending and receiving functions and that is configured to communicate with a terminal device. The device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (for example, a home evolved NodeB, HeNB, or a home Node B, HNB), a baseband unit (baseBand unit, BBU), an access point (access point, AP) in a wireless fidelity (wireless fidelity, Wi-Fi) system, a wireless relay node, a wireless backhaul node, a transmission point (transmission point, TP), a transmission reception point (transmission and reception point, TRP), or the like. Alternatively, the device may be a gNB or a transmission point (TRP or TP) in a 5G system such as an NR system, may be one antenna panel or a group of antenna panels (including a plurality of antenna panels) of a gNB in a 5G system, or may be a network node, for example, a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and a service, to implement functions of a radio resource control (radio resource control, RRC) layer and a packet data convergence protocol (packet data convergence protocol, PDCP) layer. The DU is responsible for processing a physical layer protocol and a real-time service, to implement functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that, the network device may be a device including one or more of a CU node, a DU node, or an AAU node. In addition, the CU may be classified into a network device in an access network (radio access network, RAN), or may be classified into a network device in a core network (core network, CN). This is not limited in this application.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a functional module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

FIG. 1 is a schematic diagram of an architecture of a positioning system to which signal transmission according to an embodiment of this application is applied. As shown in FIG. 1, in the positioning system, a terminal device is connected to a radio access network via a next-generation eNodeB (next-generation eNodeB, ng-eNB) through an LTE-Uu interface and/or via a gNB through an NR-Uu interface. The radio access network is connected to a core network via an access and mobility management function (access and mobility management function, AMF) through an NG-C interface. The next-generation radio access network (next-generation radio access network, NG-RAN) includes one or more ng-eNBs. The NG-RAN may alternatively include one or more gNBs. The NG-RAN may alternatively include one or more ng-eNBs and gNBs. The ng-eNB is an LTE base station that accesses a 5G core network, and the gNB is a 5G base station that accesses the 5G core network. The core network includes functions such as an AMF and an LMF. The AMF is configured to implement functions such as access management, and the LMF is configured to implement functions such as positioning. The AMF and LMF are connected through an NLs interface. The LMF may be an apparatus or a component deployed in the core network to provide a positioning function for the terminal device.

Figure 2:
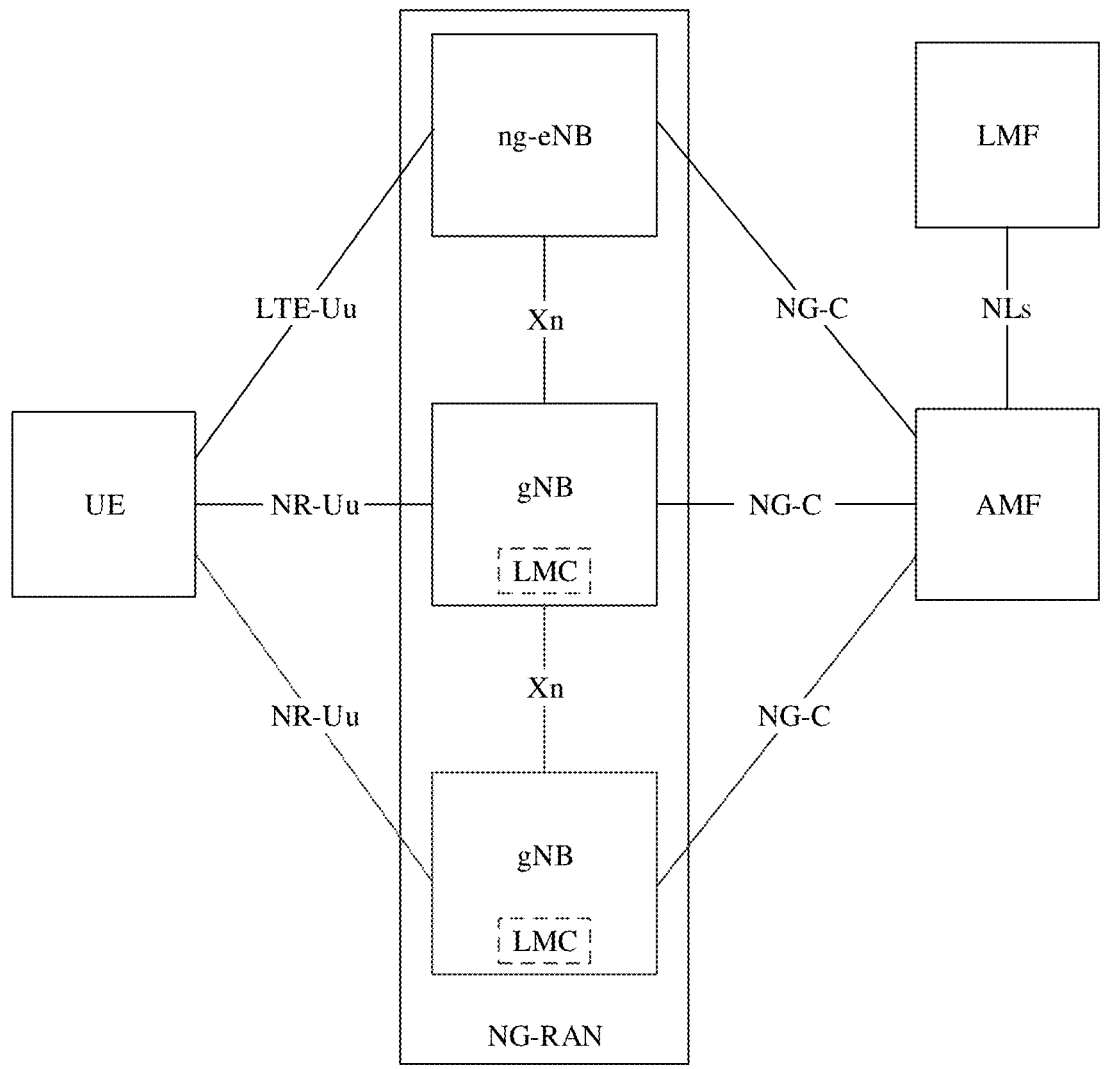
FIG. 2 is a schematic diagram of an architecture of another positioning system to which signal transmission according to an embodiment of this application is applied.

FIG. 2 is a schematic diagram of an architecture of another positioning system to which signal transmission according to an embodiment of this application is applied. A difference between architectures of the positioning systems in FIG. 1 and FIG. 2 lies in that a location management apparatus or component (for example, an LMF) in FIG. 1 is deployed in the core network, and a location management apparatus or component (for example, a location management component LMC) in FIG. 2 may be deployed in a base station. As shown in FIG. 2, the gNB includes the LMC. The LMC is a functional component of the LMF and may be integrated into a gNB on an NG-RAN side.

It should be understood that the positioning system in FIG. 1 or FIG. 2 may include one or more gNBs and one or more terminal devices. A single gNB may transmit data or control signaling to a single terminal device or a plurality of terminal devices. Alternatively, a plurality of gNBs may simultaneously transmit data or control signaling for a single terminal device.

It should be further understood that a device or a function node included in the positioning system in FIG. 1 or FIG. 2 is merely described as an example, and does not constitute a limitation on the embodiments of this application. In practice, the positioning system in FIG. 1 or FIG. 2 may further include another network element or device or function node that has an interaction relationship with the device or function node shown in the figure. This is not specifically limited herein.

To facilitate understanding of the signal transmission method provided in the embodiments of this application, the following briefly describes several basic concepts in the embodiments of this application.

1. Quasi Co-Location/Quasi-Colocation (Quasi-Colocation, QCL) Assumption Information The QCL assumption information may also be referred to as QCL information for short. The QCL information is used to assist in describing receiving beamforming information and a receiving procedure of a terminal device. The QCL information is used to indicate a QCL relationship between two reference signals. A target reference signal may be usually a demodulation reference signal (demodulation reference signal, DMRS), a CSI-RS, or the like. A referenced reference signal or a source reference signal may be usually a CSI-RS, a TRS, an SSB, or the like.

Spatial relation (spatial relation) information is used to assist in describing transmit-side beamforming information and a transmission procedure of a terminal device. The spatial relation information is used to indicate a spatial transmit parameter relationship between two types of reference signals. A target reference signal may be usually a DMRS, an SRS, or the like, and a referenced reference signal or a source reference signal may be usually a CSI-RS, an SRS, an SSB, or the like.

It should be understood that, spatial characteristic parameters of two reference signals or channels that satisfy a QCL relationship are the same, so that a spatial characteristic parameter of the target reference signal can be inferred based on a resource index of the source reference signal.

It should be further understood that, spatial characteristic parameters of two reference signals or channels that satisfy spatial relation information are the same, so that the spatial characteristic parameter of the target reference signal can be inferred based on the resource index of the source reference signal.

The spatial characteristic parameter includes one or more of the following parameters:

an angle of arrival (angle of arrival, AoA), a dominant (dominant) angle of arrival AoA, an average angle of arrival, a power angular spectrum (power angular spectrum, PAS) of the angle of arrival, an angle of departure (angle of departure, AoD), a dominant angle of departure, an average angle of departure, a power angular spectrum of the angle of departure, transmit beamforming of the terminal device, receive beamforming of the terminal device, spatial channel correlation, transmit beamforming of a network device, receive beamforming of the network device, an average channel gain, an average channel delay (average delay), delay spread (delay spread), Doppler spread (Doppler spread), a Doppler shift (doppler shift), a spatial reception parameter (spatial Rx parameters), or the like.

The spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that, the terminal device may receive the target reference signal based on information about a receive beam for the source reference signal indicated by the QCL information. The spatial characteristic parameters further help the terminal device complete transmit-side beamforming or a transmission processing process based on the spatial relation information. It should be understood that the terminal device may transmit the target reference signal based on information about a transmit beam for the source reference signal indicated by the spatial correlation information.

To reduce overheads of indicating the QCL information by the network device for the terminal device, in an optional implementation, the network device may indicate that a demodulation reference signal of a PDCCH or a physical downlink shared channel (physical downlink shared channel, PDSCH) and one or more of a plurality of reference signals previously reported by the terminal device satisfy a QCL relationship. For example, the reference signal may be a CSI-RS. Herein, each reported CSI-RS resource index corresponds to a transmit-receive beam pair that is previously established during measurement performed based on a CSI-RS resource. It should be understood that information about receive beams for two reference signals or channels that satisfy the QCL relationship is the same, and the terminal device may infer, based on a resource index of the reference signal, information about a receive beam for receiving the PDCCH or the PDSCH.

Four types of QCLs are defined in an existing standard, and the network device may simultaneously configure one or more types of QCLs for the terminal device, for example, a QCL type C, a QCL type D, QCL types A+D, and QCL types C+D:

the QCL type A: the Doppler shift (Doppler shift), the Doppler spread (Doppler spread), the average delay (average delay), and the delay spread (delay spread);
the QCL Type B: the Doppler shift and the Doppler spread;
the QCL type C: the average delay and the delay spread; and
the QCL type D: the spatial reception parameter (Spatial Rx parameter).

A positioning-related QCL type in this application mainly includes at least one of the QCL type A, the QCL type D, the QCL types A+D, the QCL type C, or the QCL types C+D.

2. Beam (beam)

The beam is a communication resource, and different beams may be considered as different communication resources. The different beams may be used to send same information, or may be used to send different information. The beam may correspond to at least one of a time domain resource, a space resource, and a frequency domain resource.

Optionally, a plurality of beams having a same communication feature or similar communication features may be considered as one beam, and one beam may include one or more antenna ports used to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

Specifically, the beam may be a wide beam, may be a narrow beam, or may be a beam of another type. A technology for forming a beam may be a beamforming technology or other technical means. This is not limited in this application. The beamforming (beam forming) technology can implement a higher antenna array gain by being oriented in a specific direction in space. In addition, beams may be classified into a transmit beam and a receive beam of a network device and a transmit beam and a receive beam of a terminal device. The transmit beam of the network device is used to describe receive-side beamforming information of the network device, and the receive beam of the network device is used to describe receive-side beamforming information of the network device. The transmit beam of the terminal device is used to describe transmit-side beamforming information of the terminal device, and the receive beam of the terminal device is used to describe receive-side beamforming information.

More specifically, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change of an analog beam direction. Therefore, one RF chain can generate only one analog beam at a same moment. In addition, for communication based on the analog beam, a beam at a transmit end and a beam at a receive end need to be aligned. Otherwise, a signal cannot be normally transmitted.

It should be understood that one or more antenna ports forming one beam may also be considered as one antenna port set.

It should be further understood that the beam may alternatively be represented by using a spatial filter (spatial filter) or a spatial transmission filter (spatial domain transmission filter). In other words, the beam may also be referred to as the "spatial filter". A transmit beam is referred to as a "spatial transmit filter", and a receive beam is referred to as a "spatial receive filter" or a "downlink spatial filter". The receive beam of the network device or the transmit beam of the terminal device may also be referred to as an "uplink spatial filter", and the transmit beam of the network device or the receive beam of the terminal device may also be referred to as a "downlink spatial filter". Selection of N optimal beam pairs (beam pair links, BPLs) (where one BPL includes one transmit beam of the network device and one receive beam of the terminal device, or one BPL includes one transmit beam of the terminal device and one receive beam of the network device) is used by the terminal device to select the transmit beam of the network device and/or the receive beam of the terminal device based on beam sweeping performed by the network device, and is used by the network device to select the transmit beam of the terminal device and/or the receive beam of the network device based on beam sweeping performed by the terminal device.

Specifically, the transmit beam may be a transmit beam of the network device, or may be a transmit beam of the terminal device. When the transmit beam is the transmit beam of the network device, the network device sends reference signals to the terminal device by using different transmit beams, and the terminal device receives, by using a same receive beam, the reference signals sent by the network device by using the different transmit beams, determines an optimal transmit beam of the network device based on the received signals, and then feeds back the optimal transmit beam of the network device to the network device, so that the network device updates the transmit beams. When the transmit beam is the transmit beam of the terminal device, the terminal device sends reference signals to the network device by using different transmit beams, and the network device receives, by using a same receive beam, the reference signals that are sent by the terminal device by using the different transmit beams, determines an optimal transmit beam of the terminal device based on the received signals, and then feeds back the optimal transmit beam of the terminal device to the terminal device, so that the terminal device updates the transmit beam. A process of sending the reference signals by using the different transmit beams may be referred to as beam sweeping, and a process of determining the optimal transmit beam based on the received signals may be referred to as beam matching.

The receive beam may be a receive beam of the network device, or may be a receive beam of the terminal device. When the receive beam is the receive beam of the network device, the terminal device sends reference signals to the network device by using a same transmit beam, and the network device receives, by using different receive beams, the reference signals sent by the terminal device, and then determines an optimal receive beam of the network device based on the received signals, to update the receive beam of the network device. When the receive beam is the receive beam of the terminal device, the network device sends reference signals to the terminal device by using a same transmit beam, and the terminal device receives, by using different receive beams, the reference signals sent by the network device, and then determines an optimal receive beam of the terminal device based on the received signals, to update the receive beam of the terminal device.

It should be noted that, for downlink beam training, the network device configures a type of a reference signal resource set for beam training. When a repetition parameter configured for the reference signal resource set is "on", the terminal device assumes that reference signal resources in the reference signal resource set are transmitted by using a same downlink spatial filter, that is, are transmitted by using a same transmit beam. In this case, usually, the terminal device receives the reference signal resources in the reference signal resource set by using different receive beams, and obtains an optimal receive beam of the terminal device through training. Optionally, the terminal device may report channel quality that is of reference signals corresponding to N optimal reference signal resources and that is measured by the terminal device. When the repetition parameter configured for the reference signal resource set is "off", the terminal device does not assume that the reference signal resources in the reference signal resource set are transmitted by using the same downlink spatial filter, that is, does not assume that the network device transmits the reference signal resources by using the same transmit beam. In this case, the terminal device selects N optimal beams from the resource set by measuring channel quality of the reference signal corresponding to the reference signal resources in the set, and feeds back the N optimal beams to the network device. Usually, in this case, the terminal device uses a same receive beam in this process.

3. Positioning Reference Signal (Positioning Reference Signal, PRS)

In an LTE system, a positioning technology based on an observed time difference of arrival (observed time difference of arrival, OTDOA) is standardized in Rel-9. In the positioning technology, a terminal device mainly receives and measures PRSs sent by several cells, calculates a measurement value such as a reference signal time difference of arrival (reference signal time difference, RSTD), and sends the measurement value to an evolved serving mobile positioning center (evolved serving mobile location center, E-SMLC). The E-SMLC determines a location of the terminal device based on the received measurement value. An LTE positioning requirement is to comply with regulatory requirements. Specifically, horizontal positioning precision is required to be less than 50 m, and vertical positioning is required to be precise enough to identify a floor.

A recent PRS design-related conclusion of NR Rel-16 is that a PRS sent by a base station (or a transmit end) may include a plurality of resource sets (resource sets), and each resource set includes a plurality of resources (resources). Each resource in one resource set corresponds to one beam, and each resource has its own index (identify, ID) number. Resources in different resource sets are sent on a same beam, and PRS measurement performed by the terminal device on all beams in a beam sweeping manner increases PRS measurement time.

4. OTDOA

In an OTDOA positioning technology, a plurality of base stations send PRSs to a terminal device, and the terminal device obtains signal arrival time information by measuring the PRSs sent by the plurality of base stations. The terminal device may report the signal arrival time information of the PRSs that is obtained through measurement to a location management unit, and the location management unit calculates a geographical location of the terminal device based on geographical locations of the plurality of base stations. Alternatively, the terminal device may calculate the geographic location of the terminal device based on the signal arrival time information of the PRSs that is obtained through measurement and with reference to the geographic locations of the plurality of base stations that are indicated by the location management unit.

The OTDOA is a technology of positioning performed based on a time difference of signal propagation between the mobile terminal device and each of the plurality of base stations, for example, three base stations. According to the OTDOA, a distance difference between the terminal device and two base stations is calculated by measuring a time difference of wireless signal propagation between the terminal device and the two base stations. A moving track of the mobile terminal device is a hyperbola in which the two base stations are used as focuses and the distance difference between the mobile terminal device and the two base stations is used as a constant difference. To achieve precise positioning, same measurement and calculation need to be performed on other two base stations to obtain another hyperbola. Because a network knows a propagation delay between a serving cell (which may also be referred to as a serving base station) and the mobile terminal device, a distance between the base station and the mobile terminal may be estimated from an OTDOA measurement value provided by the mobile terminal device. An intersection point of different circles formed by the three base stations is an estimated location of the terminal.

In enhanced machine type communication (enhance machine class communication, eMTC) OTDOA enhancement discussed in LTE Rel-14, because a downlink bandwidth of a terminal device of the eMTC is 1.4 MHz, a PRS with a bandwidth of 1.4 MHz is designed specifically for eMTC UE. In addition, a PRS applied to a mobile broadband (mobile broadband, MBB) terminal device is also normally sent. Therefore, that one cell can be configured with three PRSs with different bandwidths is defined in LTE Rel-14, and other parameters such as periodicities can be independently configured for the three PRSs. QCL association is not configured for PRSs in existing LTE. However, there are a plurality of beams in an NR system, and PRSs are sent on the plurality of beams. If QCL association is not configured, PRS measurement is prolonged because a receive beam needs to be trained. This affects positioning efficiency.

A positioning requirement in a 5G system or the new radio NR system includes a regulatory requirement and a commercial scenario requirement. The regulatory requirement is the same as the LTE positioning requirement. For a commercial scenario, for outdoors, horizontal positioning precision is required to be less than 10 m, and vertical positioning precision is required to be less than 3 m (to be determined); for indoors, horizontal positioning precision is required to be less than 3 m, and vertical positioning precision is required to be less than 3 m (to be determined). Compared with the single requirement in LTE, in 5G, a plurality of levels of requirements are supported, and the commercial scenario requirement is also more stringent than that in LTE.

In addition, to facilitate understanding of the embodiments of this application, the following several descriptions are provided.

First, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Second, the terms "first", "second", and various numbers in the following embodiments are merely used for differentiation for ease of description, and are not used to limit the scope of the embodiments of this application. For example, different PRS resource sets are distinguished.

Third, "Storing" in the embodiments of this application may be storage in one or more memories. The one or more memories may be separately disposed, or may be integrated into an encoder, a decoder, a processor, or a communication apparatus. Alternatively, a part of the one or more memories may be separately disposed, and a part of the one or more memories are integrated into a decoder, a processor, or a communication apparatus. A type of the memory may be a storage medium in any form. This is not limited in this application.

Fourth, a "protocol" in the embodiments of this application may be a standard protocol in the communication field, for example, may include an LTE protocol, an NR protocol, and a related protocol applied to a future communication system. This is not limited in this application.

It should be further understood that, a specific structure of an execution body of a method provided in the embodiments of this application is not specifically limited in the embodiments shown below, provided that a program that records code of the method provided in the embodiments of this application can be run to perform communication according to the method provided in the embodiments of this application. For example, the method provided in the embodiments of this application may be performed by a terminal device or a network device, or a functional module that is in the terminal device or the network device and that can invoke and execute the program.

Without loss of generality, interaction between the network device and the terminal device is used as an example below to describe in detail the signal transmission method provided in the embodiments of this application.

An embodiment of this application provides a signal transmission method. A QCL configuration of a positioning reference signal is provided for a terminal device, and the terminal device is assisted in determining a receive beam for the positioning reference signal, so that overheads of performing receive beam sweeping by the terminal device can be reduced. The following describes in detail an embodiment of this application with reference to FIG. 3.

Figure 3:
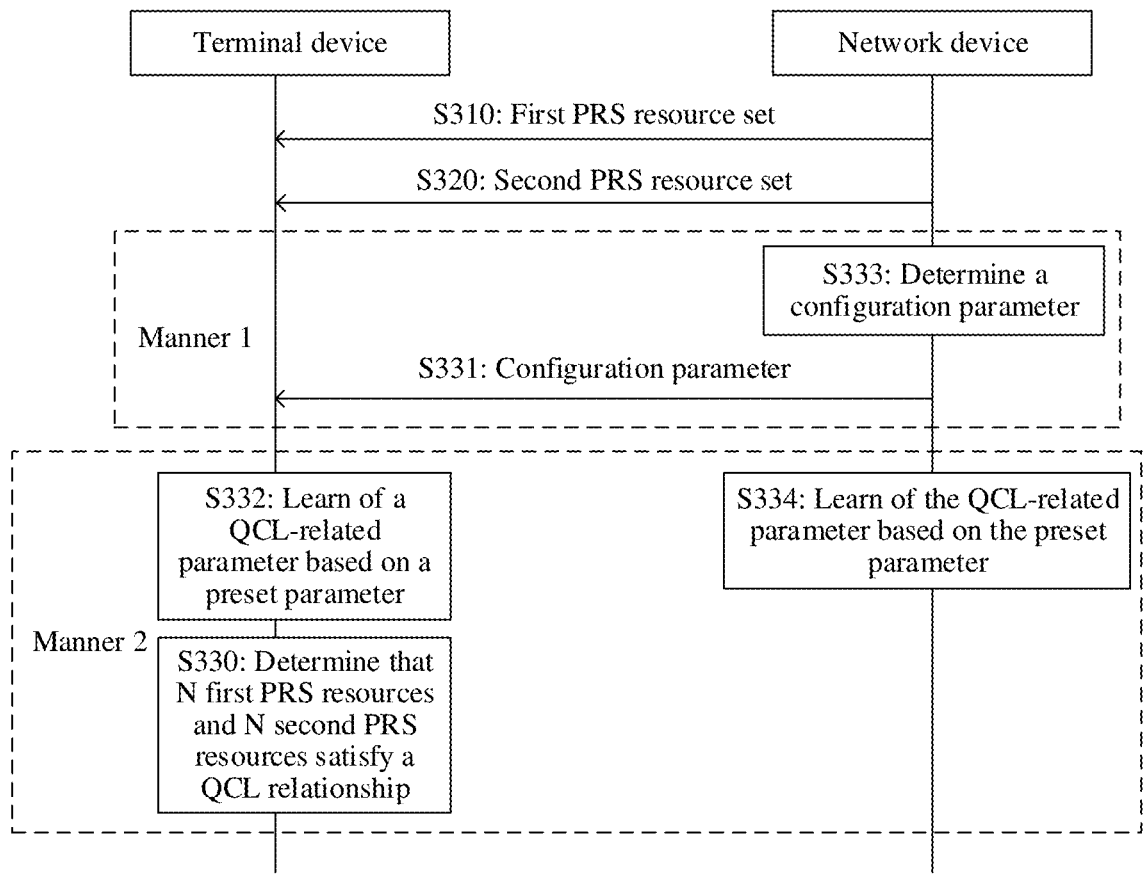
FIG. 3 is a schematic flowchart of a signal transmission method according to an embodiment of this application.

FIG. 3 is a schematic flowchart of a signal transmission method according to an embodiment of this application. Execution bodies include a terminal device and a network device.

The signal transmission method includes the following steps.

S310: The network device sends a first PRS resource set to the terminal device.

Optionally, in a possible implementation, the network device may directly send the first PRS resource set to the terminal device. In another possible implementation, the network device may alternatively send first configuration information to the terminal device, where the first configuration information is used to indicate the first PRS resource set, and the terminal device obtains the first PRS resource set based on the first configuration information.

S320: The network device sends a second PRS resource set to the terminal device.

Optionally, in a possible implementation, the network device may directly send the second PRS resource set to the terminal device. In another possible implementation, the network device may alternatively send second configuration information to the terminal device, where the second configuration information is used to indicate the second PRS resource set, and the terminal device obtains the second PRS resource set based on the second configuration information. The first configuration information and the second configuration information may be same configuration information, or may be different configuration information.

It should be understood that a sequence of sending the first PRS resource set and the second PRS resource set by the network device to the terminal device is not limited in this embodiment of this application. For example, after the network device sends the first PRS resource set to the terminal device, the network device sends the second PRS resource set to the terminal device; or before the network device sends the first PRS resource set to the terminal device, the network device sends the second PRS resource set to the terminal device; or the network device simultaneously sends the first PRS resource set and the second PRS resource set to the terminal device.

Optionally, the network device in this embodiment of this application includes the LMF shown in FIG. 1 or the LMC and the LMF shown in FIG. 2.

It should be further understood that how the network device sends the PRS resource set to the terminal device is not limited in this embodiment of this application. For details, refer to a specification in an existing protocol, or a manner in which the network device sends the PRS resource set to the terminal device after development of a communication technology.

In a possible implementation, the first PRS resource set includes M first PRS resources, and the M first PRS resources are sequentially sent on M transmit beams. The second PRS resource set includes M second PRS resources, and the M second PRS resources are sequentially sent on the M transmit beams, where M is a positive integer.

For ease of understanding, transmit beams corresponding to PRS resources in different PRS resource sets are briefly described with reference to FIG. 4.

Figure 4:
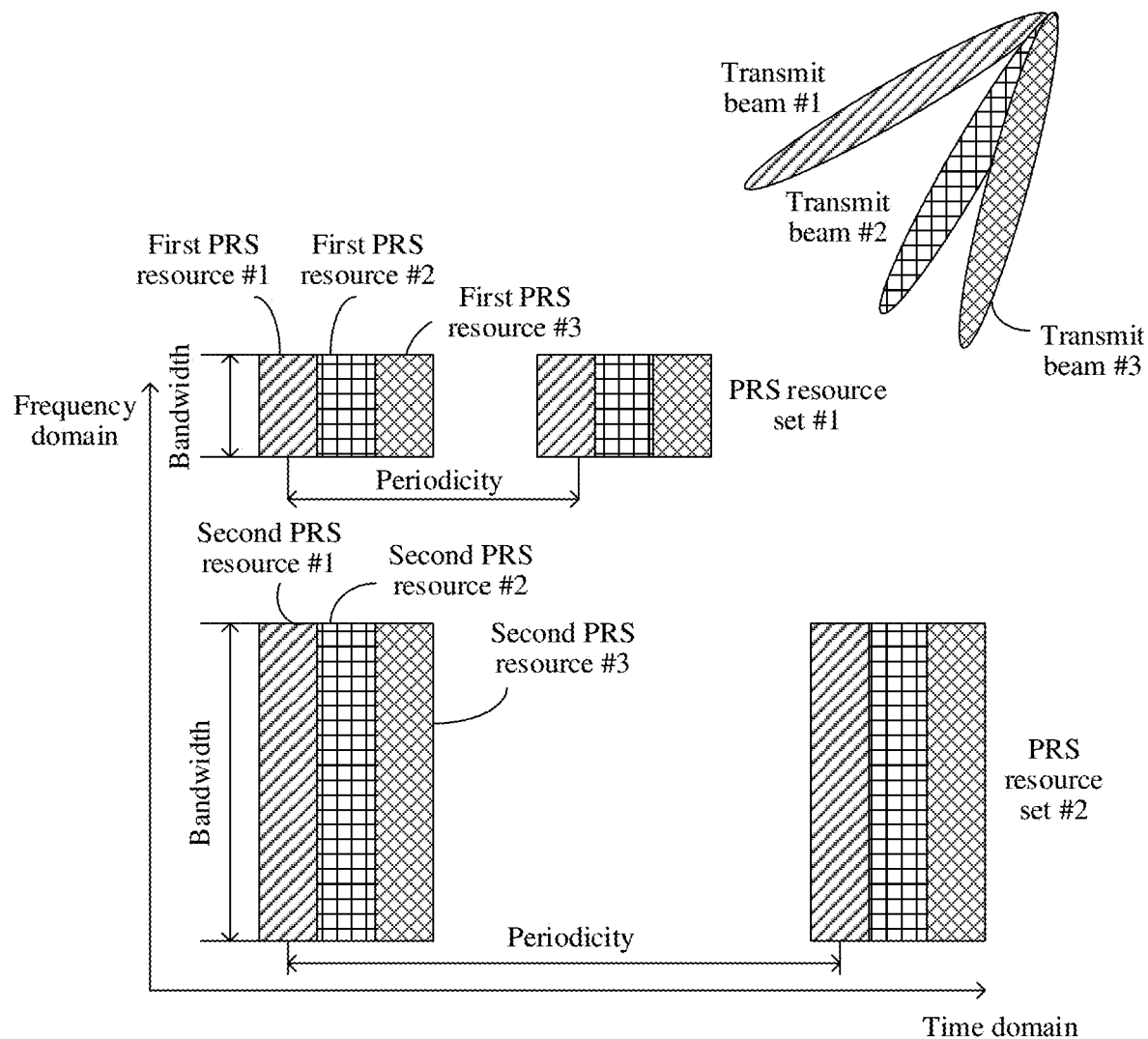
FIG. 4 is a schematic diagram in which a PRS resource in a PRS resource set corresponds to a transmit beam according to an embodiment of this application.

FIG. 4 is a schematic diagram in which a PRS resource in a PRS resource set corresponds to a transmit beam according to an embodiment of this application. A PRS resource set #1, a PRS resource set #2, and a transmit beam set are included.

It can be learned from FIG. 4 that the PRS resource set #1 includes three PRS resources (a first PRS resource #1 to a first PRS resource #3), the PRS resource set #2 includes three PRS resources (a second PRS resource #1 to a second PRS resource #3), and the transmit beam set includes three transmit beams (a transmit beam #1 to a transmit beam #3). Both the first PRS resource #1 and the second PRS resource #1 are sent on the transmit beam #1, both the first PRS resource #2 and the second PRS resource #2 are sent on the transmit beam #2, and both the first PRS resource #3 and the second PRS resource #3 are sent on the transmit beam #3.

Specifically, periodicities and bandwidths of the PRS resource set #1 and the PRS resource set #2 are different. Periodicities and bandwidths of the first PRS resource #1 to the first PRS resource #3 in the PRS resource set #1 are the same, and periodicities and bandwidths of the second PRS resource #1 to the second PRS resource #3 in the PRS resource set #2 are the same. A QCL relationship between PRS resources configured by using different parameters (for example, periodicities and/or bandwidths) is not specified in a current protocol. Therefore, even if both the first PRS resource #1 and the second PRS resource #1 are sent on the transmit beam #1, a terminal device side cannot learn that the first PRS resource #1 and the second PRS resource #1 can be received by using a same receive beam, but receives, through beam sweeping, PRSs respectively corresponding to the first PRS resource #1 and the second PRS resource #1. This increases PRS measurement time.

In another possible implementation, the first PRS resource set includes P1 first PRS resources, and the P1 first PRS resources are sequentially sent on P1 transmit beams. The second PRS resource set includes P2 second PRS resources, and the P2 second PRS resources are sequentially sent on P2 transmit beams. P1 and P2 are not equal and are both positive integers.

For example, the network device includes six transmit beams (a beam #1 to a beam #6) used to send PRS resources. The first PRS resource set includes four first PRS resources, and the four first PRS resources are sequentially sent on four transmit beams (the beam #1 to the beam #4). The second PRS resource set includes two second PRS resources, and the two second PRS resources are sequentially sent on two transmit beams (the beam #1 and the beam #2).

In another possible implementation, the first PRS resource set includes P3 first PRS resources, and the P3 first PRS resources are sequentially sent on P3#1 transmit beams. The second PRS resource set includes P3 second PRS resources, and the P3 second PRS resources are sequentially sent on P3#2 transmit beams. P3 is a positive integer, values of P3#1 and P3#2 are equal, but a part or all of the P3#1 transmit beams and the P3#2 transmit beams are different.

For example, the network device includes six transmit beams (a beam #1 to a beam #6) used to send PRS resources. The first PRS resource set includes four first PRS resources, and the four first PRS resources are sequentially sent on four transmit beams (the beam #1 to the beam #4). The second PRS resource set includes four second PRS resources, and the four second PRS resources are sequentially sent on four transmit beams (the beam #6 to the beam #3).

It should be understood that the foregoing descriptions of possible forms of the PRS resources included in the first PRS resource set and the second PRS resource set are merely examples, and constitute no limitation on the protection scope of this application. In this application, N first PRS resources in the first PRS resource set and N second PRS resources in the second PRS resource set correspond to same N transmit beams, where N is a positive integer less than or equal to M.

In this embodiment of this application, the N first PRS resources in the first PRS resource set and the N second PRS resources in the second PRS resource set satisfy a quasi-colocation QCL relationship. In other words, the method procedure shown in FIG. 3 further includes the following steps.

S330: The terminal device determines that the N first PRS resources and the N second PRS resources satisfy the QCL relationship, where N is an integer greater than or equal to 1.

According to the signal transmission method shown in FIG. 3, after receiving the first PRS resource set and the second PRS resource set, and learning that the N first PRS resources in the first PRS resource set and the N second PRS resources in the second PRS resource set satisfy the QCL relationship, the terminal device receives, by using a same receive beam, two PRSs corresponding to two PRS resources satisfying the QCL relationship. This helps the terminal device determine the receive beam for the positioning reference signal, and can reduce overheads of performing receive beam sweeping by the terminal device.

It should be understood that, in this embodiment of this application, the N first PRS resources correspond one-to-one to the N second PRS resources, to form N pairs of PRS resources, and each pair of PRS resources in the N pairs of PRS resources satisfy the QCL relationship.

For example, N=1. One first PRS resource is a first PRS resource #1, one second PRS resource is a second PRS resource #1, and the first PRS resource #1 and the second PRS resource #1 form one pair of PRS resources, which is denoted as a PRS resource group #1. Specifically, the first PRS resource #1 and the second PRS resource #1 in the PRS resource group #1 satisfy the QCL relationship.

For example, N=3. The N first PRS resources are a first PRS resource #1, a first PRS resource #2, and a first PRS resource #3. The N second PRS resources are a second PRS resource #1, a second PRS resource #2, and a second PRS resource #3. The first PRS resource #1 and the second PRS resource #1 form one pair of PRS resources, which is denoted as a PRS resource group #1. The first PRS resource #2 and the second PRS resource #2 form one pair of PRS resources, which is denoted as a PRS resource group #2. The first PRS resource #3 and the second PRS resource #3 form one pair of PRS resources, which is denoted as a PRS resource group #3. Specifically, the first PRS resource #1 and the second PRS resource #1 in the PRS resource group #1 satisfy the QCL relationship, the first PRS resource #2 and the second PRS resource #2 in the PRS resource group #2 satisfy the QCL relationship, and the first PRS resource #3 and the second PRS resource #3 in the PRS resource group #3 satisfy the QCL relationship.

Further, the terminal device may determine, based on a QCL-related parameter, that the N first PRS resources and the N second PRS resources satisfy the quasi-colocation QCL relationship, where the QCL-related parameter includes one or more of the following parameters:

a QCL type, an index of the first PRS resource set, and an index of the second PRS resource set.

Optionally, the QCL-related parameter further includes: indexes of the N first PRS resources and indexes of the N second PRS resources.

For example, the QCL-related parameter includes the index of the first PRS resource set, the index of the second PRS resource set, an index of one first PRS resource in the first PRS resource set, and an index of one second PRS resource in the second PRS resource set. The first PRS resource and the second PRS resource have the QCL relationship. Alternatively, the QCL-related parameter includes the index of the first PRS resource set, the index of the second PRS resource set, indexes of three first PRS resources in the first PRS resource set, and indexes of three second PRS resources in the second PRS resource set. The three first PRS resources and the three second PRS resources satisfy the QCL relationship in a one-to-one correspondence manner.

In a possible implementation, all of the QCL-related parameter is preset.

In another possible implementation, all of the QCL-related parameter is configured by the network device.

In still another possible implementation, a part of the QCL-related parameter is preset, and a remaining part of the QCL-related parameter is configured by the network device.

The terminal device may learn of the QCL-related parameter in any one of the following six manners:

Manner 1:

The method procedure shown in FIG. 3 further includes:

S331: The network device sends a configuration parameter to the terminal device.

The configuration parameter includes:
the index of the first PRS resource set and the index of the second PRS resource set; or
the configuration parameter includes:
the indexes of the N first PRS resources and the indexes of the N second PRS resources; or
the configuration parameter includes:
the index of the first PRS resource set, the index of the second PRS resource set, the indexes of the N first PRS resources, and the indexes of the N second PRS resources; or
the configuration parameter includes:
the QCL type, the index of the first PRS resource set, and the index of the second PRS resource set; or the configuration parameter includes:
the QCL type, the indexes of the N first PRS resources, and the indexes of the N second PRS resources; or
the configuration parameter includes:
the QCL type, the index of the first PRS resource set, the index of the second PRS resource set, the indexes of the N first PRS resources, and the indexes of the N second PRS resources.

It should be understood that the "index" in this application may be understood as identifier information. For example, the index of the PRS resource may be understood as identifier information, for example, a PRS resource identifier (resource ID), that identifies the PRS resource. It should be noted that, in the embodiments of this application, the "identifier" may be replaced with the "index", and the "index" may be replaced with the "identifier".

Manner 2:

The method procedure shown in FIG. 3 further includes:

S332: The terminal device learns of the QCL-related parameter based on a preset parameter.

The preset parameter includes:
the index of the first PRS resource set and the index of the second PRS resource set; or the preset parameter includes:
the indexes of the N first PRS resources and the indexes of the N second PRS resources; or
the preset parameter includes:
the index of the first PRS resource set, the index of the second PRS resource set, the indexes of the N first PRS resources, and the indexes of the N second PRS resources; or
the preset parameter includes:
the QCL type, the index of the first PRS resource set, and the index of the second PRS resource set; or
the configuration parameter includes:
the QCL type, the indexes of the N first PRS resources, and the indexes of the N second PRS resources; or
the preset parameter includes:
the QCL type, the index of the first PRS resource set, the index of the second PRS resource set, the indexes of the N first PRS resources, and the indexes of the N second PRS resources.

For example, the terminal device and the network device may store the preset parameter in local storage systems of the terminal device and the network device.

It should be understood that the manner 1 and the manner 2 may be combined. For example, the QCL type and the index of the first PRS resource set are configured by the network device by using the configuration parameter, and the index of the second PRS resource set, the indexes of the N first PRS resources, and the indexes of the N second PRS resources are the preset parameter. Alternatively, the index of the first PRS resource set, the index of the second PRS resource set, the indexes of the N first PRS resources, and the indexes of the N second PRS resources are configured by the network device by using the configuration parameter, and the QCL type is the preset parameter.

In a possible implementation, when the QCL-related parameter includes the QCL type, the index of the first PRS resource set, and the index of the second PRS resource set, that the terminal device determines, based on the QCL-related parameter, that the N first PRS resources and the N second PRS resources satisfy the quasi-colocation QCL relationship includes:

The first PRS resource set includes the N first PRS resources, and the N first PRS resources are sequentially sent on the N transmit beams; and the second PRS resource set includes the N second PRS resources, and the N second PRS resources are sequentially sent on the N transmit beams.

The N first PRS resources in the first PRS resource set and the N second PRS resources in the second PRS resource set satisfy the QCL relationship. To be specific, when learning of the QCL type, the index of the first PRS resource set, and the index of the second PRS resource set, the terminal device can determine that the N first PRS resources and the N second PRS resources satisfy the QCL relationship.

Optionally, that the N first PRS resources and the N second PRS resources satisfy the QCL relationship may be that the indexes of the N first PRS resources are the same as the indexes of the N second PRS resources; or positions of the N first PRS resources in the first PRS resource set are the same as positions of the N second PRS resources in the second PRS resource set; or the N first PRS resources and the N second PRS resources have a specified QCL relationship, where the specified QCL relationship may be preset in a protocol or configured by the network device.

For example, the index of the first PRS resource set is a PRS resource set #1, the index of the second PRS resource set is a PRS resource set #2, and three first PRS resources included in the first PRS resource set and three second PRS resources included in the second PRS resource set satisfy the QCL relationship, where the three first PRS resources correspond one-to-one to the three second PRS resources, and the one-to-one correspondence may mean that indexes are the same, or resource positions in the PRS resource sets are the same, or another one-to-one correspondence manner. This is not limited in this application.

For another example, the index of the first PRS resource set is a PRS resource set #1, the index of the second PRS resource set is a PRS resource set #2, and one first PRS resource included in the first PRS resource set and one second PRS resource included in the second PRS resource set satisfy the QCL relationship, where the first PRS resource corresponds to the second PRS resource, and the correspondence may mean that indexes are the same, or resource positions in the PRS resource sets are the same, or there is a specified correspondence. This is not limited in this application. In this case, the QCL-related parameter includes:

the QCL type; and
the PRS resource set #1 and the PRS resource set #2.

In other words, after learning of the QCL-related parameter, the terminal device can learn, based on the indexes, namely, the PRS resource set #1 and the PRS resource set #2, of the PRS resource sets, that all the PRS resources in the first PRS resource set corresponding to the PRS resource set #1 and all the PRS resources in the second PRS resource set corresponding to the PRS resource set #2 satisfy the QCL relationship. It should be understood that, in this implementation, a quantity of first PRS resources included in the first PRS resource set is the same as a quantity of second PRS resources included in the second PRS resource set, a transmit beam for sending the first PRS resource in the first PRS resource set is the same as a transmit beam for sending the second PRS resource in the second RS resource set, and a position of the transmit beam for sending the first PRS resource in the first PRS resource set is the same as a position of the transmit beam for sending the second PRS resource in the second RS resource set.

In another possible implementation, when the QCL-related parameter includes the QCL type, the index of the first PRS resource set, the index of the second PRS resource set, the indexes of the N first PRS resources, and the indexes of the N second PRS resources, that the terminal device determines, based on the QCL-related parameter, that the N first PRS resources and the N second PRS resources satisfy the quasi-colocation QCL relationship includes:

The first PRS resource set includes P1 first PRS resources, and the P1 first PRS resources are sequentially sent on P1 transmit beams; and the second PRS resource set includes P2 second PRS resources, and the P2 second PRS resources are sequentially sent on P2 transmit beams, where P1 and P2 are integers greater than or equal to N.

The N first PRS resources in the first PRS resource set and the N second PRS resources in the second PRS resource set satisfy the QCL relationship, where N is a positive integer less than or equal to P1 and P2. To be specific, when learning of the QCL type, the index of the first PRS resource set, the index of the second PRS resource set, the indexes of the N first PRS resources, and the indexes of the N second PRS resources, the terminal device can determine that the N first PRS resources and the N second PRS resources satisfy the QCL relationship.

Optionally, that the N first PRS resources and the N second PRS resources satisfy the QCL relationship may be that the indexes of the N first PRS resources are the same as the indexes of the N second PRS resources; or positions of the N first PRS resources in the first PRS resource set are the same as positions of the N second PRS resources in the second PRS resource set; or the N first PRS resources and the N second PRS resources have a specified QCL relationship, where the specified QCL relationship may be preset in a protocol or configured by the network device.

For example, the index of the first PRS resource set is a PRS resource set #1, the index of the second PRS resource set is a PRS resource set #2, and three first PRS resources in the first PRS resource set and three second PRS resources in the second PRS resource set satisfy the QCL relationship. Indexes of the three first PRS resources are respectively a PRS resource #1, a PRS resource #2, and a PRS resource #3. Indexes of the three second PRS resources are also respectively a PRS resource #1, a PRS resource #2, and a PRS resource #3. The PRS resources having the same resource index satisfy the QCL relationship. In this case, the QCL-related parameter includes:

the QCL type;
the PRS resource set #1 and the PRS resource set #2; and
the PRS resource #1, the PRS resource #2, and the PRS resource #3.

After learning of the QCL-related parameter, the terminal device can learn, based on the indexes, namely, the PRS resource set #1 and the PRS resource set #2, of the PRS resource sets, that there are PRS resources satisfying the QCL relationship in the first PRS resource set corresponding to the PRS resource set #1 and the second PRS resource set corresponding to the PRS resource set #2. Further, the terminal device can learn, based on the indexes, namely, the PRS resource #1, the PRS resource #2, and the PRS resource #3, of the PRS resources, that the three PRS resources whose indexes are respectively the PRS resource #1, the PRS resource #2, and the PRS resource #3 in the first PRS resource set and the three PRS resources whose indexes are respectively the PRS resource #1, the PRS resource #2, and the PRS resource #3 in the second PRS resource set satisfy the QCL relationship. It should be understood that, in this implementation, a quantity of first PRS resources included in the first PRS resource set may be different from a quantity of second PRS resources included in the second PRS resource set, a transmit beam for sending the first PRS resource in the first PRS resource set is partially the same as a transmit beam for sending the second PRS resource in the second RS resource set, and a position of the transmit beam for sending the first PRS resource in the first PRS resource set may be different from a position of the transmit beam for sending the second PRS resource in the second RS resource set.

In this implementation, the network device may configure that two PRS resources separately included in two PRS resource sets satisfy the QCL relationship. For example, the configuration parameter includes:

the QCL type;
the PRS resource set #1 and the PRS resource set #2; and
the PRS resource #1.

Alternatively:

In this implementation, that two PRS resources separately included in two PRS resource sets satisfy the QCL relationship may be pre-defined in a protocol. For example, the preset parameter includes:

the QCL type;
the PRS resource set #1 and the PRS resource set #2; and
the PRS resource #1.

It indicates that a PRS resource whose index is the PRS resource #1 in a PRS resource set corresponding to the PRS resource set #1 and a PRS resource whose index is the PRS resource #1 in a PRS resource set corresponding to the PRS resource set #2 satisfy the QCL relationship.

In another possible implementation, when the QCL-related parameter includes the index of the first PRS resource set and the index of the second PRS resource set, that the terminal device determines, based on the QCL-related parameter, that the N first PRS resources and the N second PRS resources satisfy the quasi-colocation QCL relationship includes:

The first PRS resource set includes the N first PRS resources, and the N first PRS resources are sequentially sent on the N transmit beams; and the second PRS resource set includes the N second PRS resources, and the N second PRS resources are sequentially sent on the N transmit beams.

The N first PRS resources in the first PRS resource set and the N second PRS resources in the second PRS resource set satisfy the QCL relationship. To be specific, when learning of the QCL type, the index of the first PRS resource set, and the index of the second PRS resource set, the terminal device can determine that the N first PRS resources and the N second PRS resources satisfy the QCL relationship.

Optionally, that the N first PRS resources and the N second PRS resources satisfy the QCL relationship may be that the indexes of the N first PRS resources are the same as the indexes of the N second PRS resources; or positions of the N first PRS resources in the first PRS resource set are the same as positions of the N second PRS resources in the second PRS resource set; or the N first PRS resources and the N second PRS resources have a specified QCL relationship, where the specified QCL relationship may be preset in a protocol or configured by the network device.

For example, the index of the first PRS resource set is a PRS resource set #1, the index of the second PRS resource set is a PRS resource set #2, and three first PRS resources included in the first PRS resource set and three second PRS resources included in the second PRS resource set satisfy the QCL relationship, where the three first PRS resources correspond one-to-one to the three second PRS resources, and the one-to-one correspondence may mean that indexes are the same, or resource positions in the PRS resource sets are the same, or another one-to-one correspondence manner. This is not limited in this application.

For another example, the index of the first PRS resource set is a PRS resource set #1, the index of the second PRS resource set is a PRS resource set #2, and one first PRS resource included in the first PRS resource set and one second PRS resource included in the second PRS resource set satisfy the QCL relationship, where the first PRS resource corresponds to the second PRS resource, and the correspondence may mean that indexes are the same, or resource positions in the PRS resource sets are the same, or there is a specified correspondence. This is not limited in this application. In this case, the QCL-related parameter includes:

the PRS resource set #1 and the PRS resource set #2.

In other words, after learning of the QCL-related parameter, the terminal device can learn, based on the indexes, namely, the PRS resource set #1 and the PRS resource set #2, of the PRS resource sets, that all the PRS resources in the first PRS resource set corresponding to the PRS resource set #1 and all the PRS resources in the second PRS resource set corresponding to the PRS resource set #2 satisfy the QCL relationship. Alternatively, the terminal device can learn, based on the indexes, namely, the PRS resource set #1 and the PRS resource set #2, of the PRS resource sets, that one or more first PRS resources in the PRS resource set #1 and one or more second PRSs in the PRS resource set #2 satisfy the QCL relationship. It should be understood that, in this implementation, a quantity of first PRS resources included in the first PRS resource set is the same as a quantity of second PRS resources included in the second PRS resource set, a transmit beam for sending the first PRS resource in the first PRS resource set is the same as a transmit beam for sending the second PRS resource in the second RS resource set, and a position of the transmit beam for sending the first PRS resource in the first PRS resource set is the same as a position of the transmit beam for sending the second PRS resource in the second RS resource set.

In another possible implementation, when the QCL-related parameter includes the index of the first PRS resource set, the index of the second PRS resource set, the indexes of the N first PRS resources, and the indexes of the N second PRS resources, that the terminal device determines, based on the QCL-related parameter, that the N first PRS resources and the N second PRS resources satisfy the quasi-colocation QCL relationship includes:

The first PRS resource set includes P1 first PRS resources, and the P1 first PRS resources are sequentially sent on P1 transmit beams; and the second PRS resource set includes P2 second PRS resources, and the P2 second PRS resources are sequentially sent on P2 transmit beams, where P1 and P2 are integers greater than or equal to N.

The N first PRS resources in the first PRS resource set and the N second PRS resources in the second PRS resource set satisfy the QCL relationship, where N is a positive integer less than or equal to P1 and P2. To be specific, when learning of the QCL type, the index of the first PRS resource set, the index of the second PRS resource set, the indexes of the N first PRS resources, and the indexes of the N second PRS resources, the terminal device can determine that the N first PRS resources and the N second PRS resources satisfy the QCL relationship.

Optionally, that the N first PRS resources and the N second PRS resources satisfy the QCL relationship may be that the indexes of the N first PRS resources are the same as the indexes of the N second PRS resources; or positions of the N first PRS resources in the first PRS resource set are the same as positions of the N second PRS resources in the second PRS resource set; or the N first PRS resources and the N second PRS resources have a specified QCL relationship, where the specified QCL relationship may be preset in a protocol or configured by the network device.

For example, the index of the first PRS resource set is a PRS resource set #1, the index of the second PRS resource set is a PRS resource set #2, and three first PRS resources in the first PRS resource set and three second PRS resources in the second PRS resource set satisfy the QCL relationship. Indexes of the three first PRS resources are respectively a PRS resource #1, a PRS resource #2, and a PRS resource #3. Indexes of the three second PRS resources are also respectively a PRS resource #1, a PRS resource #2, and a PRS resource #3. The PRS resources having the same resource index satisfy the QCL relationship. In this case, the QCL-related parameter includes:

the PRS resource set #1 and the PRS resource set #2; and
the PRS resource #1, the PRS resource #2, and the PRS resource #3.

After learning of the QCL-related parameter, the terminal device can learn, based on the indexes, namely, the PRS resource set #1 and the PRS resource set #2, of the PRS resource sets, that there are PRS resources satisfying the QCL relationship in the first PRS resource set corresponding to the PRS resource set #1 and the second PRS resource set corresponding to the PRS resource set #2. Further, the terminal device can learn, based on the indexes, namely, the PRS resource #1, the PRS resource #2, and the PRS resource #3, of the PRS resources, that the three PRS resources whose indexes are respectively the PRS resource #1, the PRS resource #2, and the PRS resource #3 in the first PRS resource set and the three PRS resources whose indexes are respectively the PRS resource #1, the PRS resource #2, and the PRS resource #3 in the second PRS resource set satisfy the QCL relationship. It should be understood that, in this implementation, a quantity of first PRS resources included in the first PRS resource set may be different from a quantity of second PRS resources included in the second PRS resource set, a transmit beam for sending the first PRS resource in the first PRS resource set is partially the same as a transmit beam for sending the second PRS resource in the second RS resource set, and a position of the transmit beam for sending the first PRS resource in the first PRS resource set may be different from a position of the transmit beam for sending the second PRS resource in the second RS resource set.

In this implementation, the network device may configure that two PRS resources separately included in two PRS resource sets satisfy the QCL relationship. For example, the configuration parameter includes:

the PRS resource set #1 and the PRS resource set #2; and
the PRS resource #1.

Alternatively:

In this implementation, that two PRS resources separately included in two PRS resource sets satisfy the QCL relationship may be pre-defined in a protocol. For example, the preset parameter includes:

the PRS resource set #1 and the PRS resource set #2; and
the PRS resource #1.

It indicates that a PRS resource whose index is the PRS resource #1 in a PRS resource set corresponding to the PRS resource set #1 and a PRS resource whose index is the PRS resource #1 in a PRS resource set corresponding to the PRS resource set #2 satisfy the QCL relationship.

For another example, the index of the first PRS resource set is a PRS resource set #1, the index of the second PRS resource set is a PRS resource set #2, and one first PRS resource in the first PRS resource set and one second PRS resource in the second PRS resource set satisfy the QCL relationship. An index of the first PRS resource is a PRS resource #1, an index of the second PRS resource is a PRS resource #3, and the first PRS resource #1 and the second PRS resource #3 have a specified QCL relationship. In this case, the QCL-related parameter includes:

the PRS resource set #1 and the PRS resource #1; and
the PRS resource set #2 and the PRS resource #3.

After learning of the QCL-related parameter, the terminal device can learn, based on the indexes, namely, the PRS resource set #1 and the PRS resource set #2, of the PRS resource sets, that there are PRS resources satisfying the QCL relationship in the first PRS resource set corresponding to the PRS resource set #1 and the second PRS corresponding to the PRS resource set #2. Further, the terminal device can learn, based on the indexes, namely, the PRS resource #1 and the PRS resource #3, of the PRS resources, that the PRS resource whose index is the PRS resource #1 in the first PRS resource set and the PRS resource whose index is the PRS resource #3 in the second PRS resource set satisfy the QCL relationship. It should be understood that this implementation is described only by using an example in which the first PRS resource set includes one first PRS resource and the second PRS resource set includes one second PRS resource. This implementation may be extended to that N first PRS resources in the PRS resource set #1 and N second PRS resources in the PRS resource set #2 have a specified QCL relationship, where N is an integer greater than or equal to 1, and the specified QCL relationship may be preset in a protocol or configured by the network device.

It should be understood that a network device side may also learn the QCL-related parameter based on the preset parameter. In this case, the method procedure shown in FIG. 3 further includes:

S334: The network device learns of the QCL-related parameter based on the preset parameter.

In the signal transmission method shown in FIG. 3, before sending the first PRS resource set and the second PRS resource set, the network device can learn that the N first PRS resources in the first PRS resource set and the N second PRS resources in the second PRS resource set satisfy the QCL relationship, so that the network device can send, by using a same transmit beam, two PRSs corresponding to two PRS resources satisfying the QCL relationship. This helps the network device determine the transmit beam for the positioning reference signal.

A specific manner in which the network device learns of the QCL-related parameter based on the preset parameter is similar to that in which the terminal device learns of the QCL-related parameter based on the preset parameter, and details are not described herein again. Alternatively, before the network device sends the configuration parameter, the network device learns of the QCL-related parameter based on a transmit beam for sending the first PRS resource in the first PRS resource set and the second PRS resource in the second PRS resource set. The method procedure shown in FIG. 3 further includes: S333: The network device determines the configuration parameter.

The QCL type in this embodiment of this application includes at least one of the following QCL types:

a QCL type A, a QCL type D, QCL types A+D, a QCL type C, or QCL types C+D.

It should be understood that resource elements REs occupied by the first PRS resource in the first PRS resource set and the second PRS resource in the second PRS resource set overlap or partially overlap.

The REs occupied by the first PRS resource and the second PRS resource satisfying the QCL relationship may overlap or partially overlap.

Alternatively:

The resource elements REs occupied by the first PRS resource included in the first PRS resource set and the second PRS resource included in the second PRS resource set do not overlap.

Specifically, the first PRS resource and the second PRS resource that occupy all or partially overlapping REs satisfy the QCL relationship includes the following two cases:

Case 1:

Because the REs occupied by the first PRS resource and the second PRS resource all or partially overlap, the first PRS resource and the second PRS resource naturally satisfy the QCL relationship. In this case, that the first PRS resource and the second PRS resource satisfy the QCL relationship is determined without needing the QCL-related parameter.

Case 2:

According to the signal transmission method shown in FIG. 3, the QCL relationship is configured for the first PRS resource and the second PRS resource that occupy all or partially overlapping REs.

It should be understood that sequence numbers of the foregoing processes do not mean an execution sequence in the foregoing method embodiments. The execution sequence of the processes should be determined based on functions and internal logic of the processes, and should not constitute any limitation on the implementation processes of the embodiments of this application.

The foregoing describes the method embodiments provided in the embodiments of this application, and the following describes apparatus embodiments provided in the embodiments of this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in the embodiments of this application from the perspective of interaction between the devices. It may be understood that, to implement the foregoing functions, each device, such as a transmit-end device or a receive-end device, includes a corresponding hardware structure and/or software module for performing each function. A person skilled in the art may be aware that with reference to units and algorithm steps in the examples described in the embodiments disclosed in this application, this application can be implemented by hardware or a combination of computer software and hardware. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a transmit end device or a receive end device may be divided into functional modules based on the foregoing method examples. For example, the transmit end device or the receive end device may be divided into functional modules corresponding to functions, or two or more functions may be integrated into one processing module. The integrated module may be implemented in a form of hardware, or may be implemented in a form of a software functional module. It should be noted that, in the embodiment of this application, division into the modules is an example, and is merely logical function division. In an actual implementation, another division manner may be used. An example in which each functional module is obtained through division based on a corresponding function is used below for description.

Figure 5:
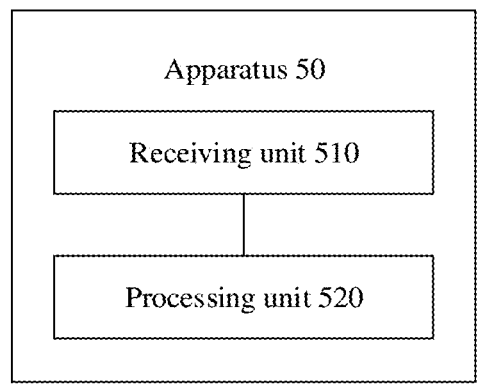
FIG. 5 is a schematic diagram of a signal transmission apparatus 50 according to this application.

FIG. 5 is a schematic diagram of a signal transmission apparatus 50 according to this application. As shown in FIG. 5, the apparatus 50 includes a receiving unit 510 and a processing unit 520.

The receiving unit 510 is configured to receive a first positioning reference signal PRS resource set.

The receiving unit 510 is further configured to receive a second PRS resource set.

It should be understood that a sequence of receiving the first PRS resource set and the second PRS resource set by the receiving unit 510 is not limited in this embodiment of this application.

The processing unit 520 is configured to determine that N first PRS resources in the first PRS resource set and N second PRS resources in the second PRS resource set satisfy a quasi-colocation QCL relationship, where N is an integer greater than or equal to 1.

For example, that the processing unit 520 determines that N first PRS resources and N second PRS resources satisfy a quasi-colocation QCL relationship includes:
determining, by the processing unit 520, that PRS resources having a same resource index in the N first PRS resources and the N second PRS resources satisfy the QCL relationship; or
determining, by the processing unit 520, that PRS resources having a same resource position in the N first PRS resources and the N second PRS resources satisfy the QCL relationship; or
determining, by the processing unit 520, that PRS resources having a specified QCL relationship in the N first PRS resources and the N second PRS resources satisfy the QCL relationship.

For example, that the processing unit 520 determines that N first PRS resources and N second PRS resources satisfy a quasi-colocation QCL relationship includes:
determining, by the processing unit 520 based on a QCL-related parameter, that the N first PRS resources and the N second PRS resources satisfy the quasi-colocation QCL relationship, where the QCL-related parameter includes one or more of the following parameters:
a QCL type, an index of the first PRS resource set, and an index of the second PRS resource set; and
a part or all of the QCL-related parameter is preset; or a part or all of the QCL-related parameter is configured by a network device.

For example, the QCL-related parameter further includes indexes of the N first PRS resources and indexes of the N second PRS resources.

Further, when the part or all of the QCL-related parameter is configured by the network device, the receiving unit 510 is further configured to receive a configuration parameter, and the configuration parameter includes the part or all of the QCL-related parameter.

For example, the receiving unit 510 receives the configuration parameter by using LPP signaling.

For example, the first PRS resource set includes M first PRS resources, and the M first PRS resources sequentially correspond one-to-one to M transmit beams; and
the second PRS resource set includes M second PRS resources, and the M second PRS resources sequentially correspond one-to-one to the M transmit beams, where M is an integer greater than or equal to N.

For example, resource elements REs occupied by the first PRS resource in the first PRS resource set and the second PRS resource in the second PRS resource set all or partially overlap, where the first PRS resource and the second PRS resource satisfy the QCL relationship; and
that the first PRS resource and the second PRS resource satisfy the QCL relationship includes:
that the first PRS resource and the second PRS resource satisfy the QCL relationship is preset; or
that the first PRS resource and the second PRS resource satisfy the QCL relationship is determined by the processing unit 520 according to the signal transmission method shown in FIG. 3.

The apparatus 50 completely corresponds to the terminal device in the method embodiments. The apparatus 50 may be the terminal device in the method embodiments, or may be a chip or a functional module inside the terminal device in the method embodiments. The corresponding units of the apparatus 50 are configured to perform corresponding steps performed by the terminal device in the method embodiment shown in FIG. 3.

The receiving unit 510 of the apparatus 50 performs the sending step of the terminal device in the method embodiment. For example, step S310 in FIG. 3 is performed to receive the first PRS resource set sent by the network device, step S320 in FIG. 3 is further performed to receive the second PRS resource set sent by the network device, and step S331 in FIG. 3 is further performed to receive the configuration parameter sent by the network device.

The processing unit 520 performs step implemented or processed internally by the terminal device in the method embodiment. For example, step S332 in FIG. 3 is performed to learn of the QCL-related parameter based on the preset parameter, and step S330 in FIG. 3 is further performed to determine that the N first PRS resources and the N second PRS resources satisfy the quasi-colocation QCL relationship.

The apparatus 50 may further include a sending unit, configured to perform a sending step performed by the terminal device, for example, send information to another device. The sending unit and the receiving unit 510 may form a transceiver unit, which has both receiving and sending functions. The processing unit 520 may be a processor. The sending unit may be a transmitter, and the receiving unit 510 may be a receiver. The receiver and the transmitter may be integrated together to form a transceiver. The transceiver may also be referred to as a communication interface or a communication unit.

Figure 6:
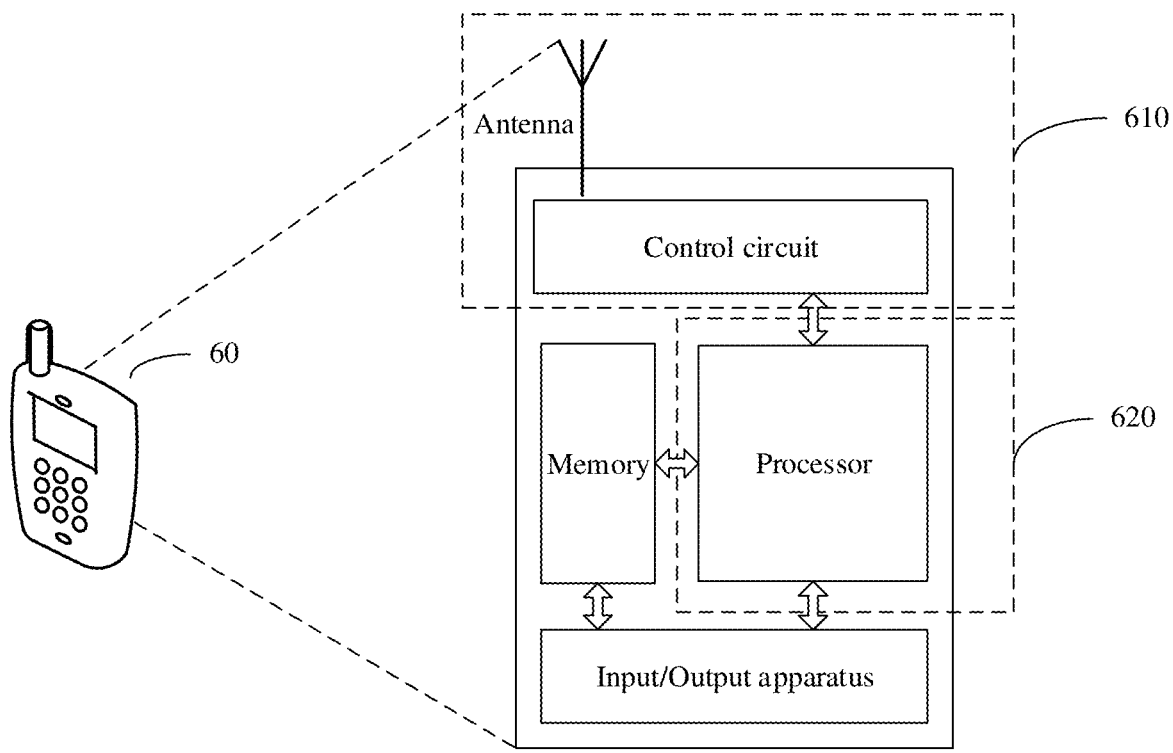
FIG. 6 is a schematic diagram of a structure of a terminal device 60 applicable to an embodiment of this application.

When the signal transmission apparatus shown in FIG. 5 is the terminal device, for ease of understanding and illustration, user equipment, for example, a mobile phone, is used as an example of the terminal device. FIG. 6 is a schematic diagram of a structure of a terminal device 60 applicable to an embodiment of this application. The terminal device 60 may be used in the system shown in FIG. 1. For ease of description, FIG. 6 shows only main components of the terminal device. As shown in FIG. 6, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit. The radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 6 shows only one memory and one processor. In an actual terminal device product, there may be one or more processors and one or more memories.

The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device.

For example, as shown in FIG. 6, the antenna and the radio frequency circuit that have the sending and receiving functions are denoted as a transceiver unit 610, and the processor that has the processing function is denoted as a processing unit 620. That is, the terminal device includes the transceiver unit 610 and the processing unit 620. The transceiver unit 610 may also be referred to as a transceiver, a transceiver machine, a transceiver apparatus, or the like. The processing unit 620 may also be referred to as a processor, a processing board, a processing module, a processing apparatus, or the like. Optionally, a component that is in the transceiver unit 610 and that is configured to implement the receiving function may be considered as a receiving unit, and a component that is in the transceiver unit 610 and that is configured to implement the sending function may be considered as a sending unit. In other words, the transceiver unit 610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

For example, in an implementation, the transceiver unit 610 is further configured to perform the receiving operations on the terminal device side in step S310, step S320, and step S331 shown in FIG. 3, and/or the transceiver unit 610 is further configured to perform other receiving and sending steps on the terminal device side. The processing unit 620 is configured to perform step S332 and step S330 shown in FIG. 3, and/or the processing unit 620 is further configured to perform another processing step on the terminal device side.

It should be understood that FIG. 6 is merely an example instead of a limitation. The terminal device including the transceiver unit and the processing unit may not depend on the structure shown in FIG. 6.

When the signal transmission apparatus 50 is the chip, the chip includes a transceiver unit and a processing unit. The transceiver unit may be an input/output circuit or a communication interface. The processing unit may be a processor, a microprocessor, or an integrated circuit integrated on the chip.

Figure 7:
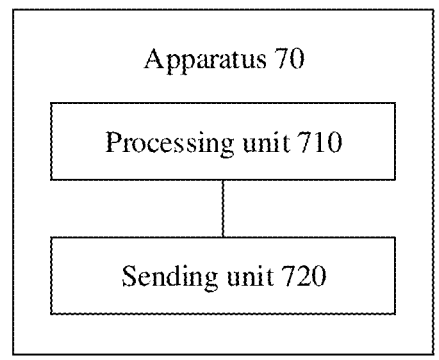
FIG. 7 is a schematic diagram of a signal transmission apparatus 70 according to this application.

FIG. 7 is a schematic diagram of a signal transmission apparatus 70 according to this application. As shown in FIG. 7, the apparatus 70 includes a processing unit 710 and a sending unit 720.

The processing unit 710 is configured to determine that N first PRS resources in a first positioning reference signal PRS resource set and N second PRS resources in a second PRS resource set satisfy a quasi-colocation QCL relationship, where N is an integer greater than or equal to 1.

The sending unit 720 is configured to send the first PRS resource set.

The sending unit 720 is further configured to send the second PRS resource set.

It should be understood that a sequence of sending the first PRS resource set and the second PRS resource set by the sending unit 720 is not limited in this embodiment of this application.

The processing unit 710 is configured to determine that the N first PRS resources in the first PRS resource set and the N second PRS resources in the second PRS resource set satisfy the quasi-colocation QCL relationship, where N is an integer greater than or equal to 1.

For example, that the processing unit 710 determines that the N first PRS resources and the N second PRS resources satisfy the quasi-colocation QCL relationship includes:

determining, by the processing unit 710, that PRS resources having a same resource index in the N first PRS resources and the N second PRS resources satisfy the QCL relationship; or determining, by the processing unit 710, that PRS resources having a same resource position in the N first PRS resources and the N second PRS resources satisfy the QCL relationship; or determining, by the processing unit 710, that PRS resources having a specified QCL relationship in the N first PRS resources and the N second PRS resources satisfy the QCL relationship.

For example, that the processing unit 710 determines that the N first PRS resources and the N second PRS resources satisfy the quasi-colocation QCL relationship includes:

determining, by the processing unit 710 based on a QCL-related parameter, that the N first PRS resources and the N second PRS resources satisfy the quasi-colocation QCL relationship, where the QCL-related parameter includes one or more of the following parameters:

a QCL type, an index of the first PRS resource set, and an index of the second PRS resource set; and a part or all of the QCL-related parameter is preset; or a part or all of the QCL-related parameter is configured by a network device.

For example, the QCL-related parameter further includes indexes of the N first PRS resources and indexes of the N second PRS resources.

Further, when the part or all of the QCL-related parameter is configured by the network device, the sending unit 720 is further configured to send a configuration parameter, and the configuration parameter includes the part or all of the QCL-related parameter.

For example, the sending unit 720 receives the configuration parameter by using LPP signaling.

For example, the first PRS resource set includes M first PRS resources, and the M first PRS resources sequentially correspond one-to-one to M transmit beams; and the second PRS resource set includes M second PRS resources, and the M second PRS resources sequentially correspond one-to-one to the M transmit beams, where M is an integer greater than or equal to N.

For example, resource elements REs occupied by the first PRS resource in the first PRS resource set and the second PRS resource in the second PRS resource set all or partially overlap, where the first PRS resource and the second PRS resource satisfy the QCL relationship; and that the first PRS resource and the second PRS resource satisfy the QCL relationship includes:

that the first PRS resource and the second PRS resource satisfy the QCL relationship is preset; or that the first PRS resource and the second PRS resource satisfy the QCL relationship is determined by the processing unit 710 according to the signal transmission method shown in FIG. 3.

The apparatus 70 completely corresponds to the network device in the method embodiments. The apparatus 70 may be the network device in the method embodiments, or may be a chip or a functional module inside the network device in the method embodiments. The corresponding units of the apparatus 70 are configured to perform corresponding steps performed by the network device in the method embodiment shown in FIG. 3.

The sending unit 720 of the apparatus 70 performs the sending step of the network device in the method embodiment. For example, step S310 in FIG. 3 is performed to send the first PRS resource set to the terminal device, step S320 in FIG. 3 is further performed to send the second PRS resource set to the terminal device, and step S331 in FIG. 3 is further performed to send the configuration parameter to the terminal device.

The processing unit 710 of the apparatus 70 performs steps implemented or processed internally by the network device in the method embodiment. For example, step S333 in FIG. 3 is performed to determine the configuration parameter, and step S334 in FIG. 3 is further performed to obtain the QCL-related parameter based on the preset parameter.

The apparatus 70 may further include a receiving unit, configured to perform a receiving step of the network device, for example, receive information sent by another device. The receiving unit and the sending unit 720 may form a transceiver unit, which has both receiving and sending functions. The processing unit 710 may be a processor. The sending unit 720 may be a transmitter. The receiving unit may be a receiver. The receiver and the transmitter may be integrated together to form a transceiver. The transceiver may also be referred to as a communication interface or a communication unit.

Figure 8:
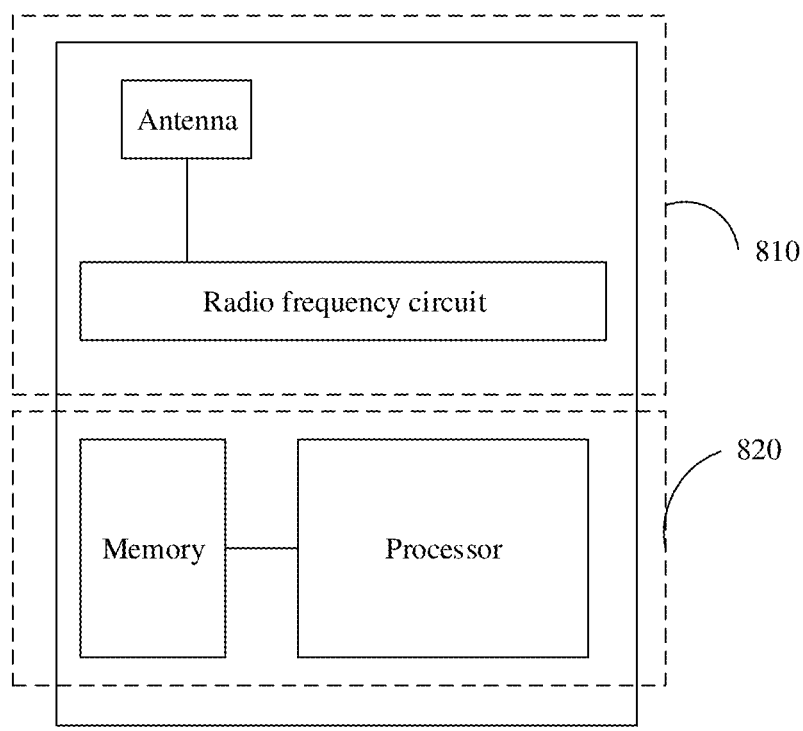
FIG. 8 is a schematic diagram of a structure of a network device 80 applicable to an embodiment of this application.

When the signal transmission apparatus shown in FIG. 7 is the network device, for ease of understanding and illustration, a location management component, for example, the LMC shown in FIG. 2, is used as an example of the network device. FIG. 8 is a schematic diagram of a structure of a network device 80 according to an embodiment of this application. The network device may be configured to implement a function of the network device in the signal transmission method.

The location management component includes a part 810 and a part 820. The part 810 is mainly configured to send and receive a radio frequency signal and perform conversion between the radio frequency signal and a baseband signal. The part 820 is mainly configured to perform baseband processing, control the location management component, and the like. The part 810 may be usually referred to as a transceiver unit, a transceiver machine, a transceiver circuit, a transceiver, or the like. The part 820 is usually a control center of the location management component, may be generally referred to as a processing unit, and is configured to control the location management component to perform a processing operation on a network device side in the foregoing method embodiments.

The transceiver unit of the part 810 may also be referred to as a transceiver machine, a transceiver, or the like, and includes an antenna and a radio frequency unit. The radio frequency unit is mainly configured to perform radio frequency processing. Optionally, a component that is in the part 810 and that is configured to implement a receiving function may be considered as a receiving unit, and a component that is in the part 810 and that is configured to implement a sending function may be considered as a sending unit. In other words, the part 810 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 820 may include one or more boards, and each board may include one or more processors and one or more memories. The processor is configured to read and execute a program in the memory, to implement a baseband processing function and control the location management component. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit of the part 810 is configured to perform the sending operation on the network device side in steps S310, S320, and S331 in FIG. 3, and/or the transceiver unit of the part 810 is further configured to perform other sending and receiving steps on the network device side in the embodiments of this application. The processing unit of the part 820 is configured to perform the processing steps on the network device side in step S33 and step S334 in FIG. 3, and/or the transceiver unit of the part 820 is further configured to perform other sending and receiving steps on the network device side in the embodiments of this application.

It should be understood that FIG. 8 is merely an example instead of a limitation. The network device including the transceiver unit and the processing unit may not depend on the structure shown in FIG. 8.

When the communication device 80 is the chip, the chip includes a transceiver unit and a processing unit. The transceiver unit may be an input/output circuit or a communication interface. The processing unit is a processor, a microprocessor, or an integrated circuit integrated on the chip.

It should be understood that the network device 80 shown in FIG. 8 can implement the function of the network device in the method embodiment in FIG. 3. Operations and/or functions of the units in the network device 80 are used to implement a corresponding procedure performed by the network device in the foregoing method embodiments. To avoid repetition, detailed descriptions are appropriately omitted herein. The structure of the network device shown in FIG. 8 is merely a possible form, and should not constitute any limitation on the embodiments of this application. In this application, a possibility that there may be a network device structure in another form in the future is not excluded.

An embodiment of this application further provides a communication system, including the foregoing terminal device, a network device, a serving cell, and a neighboring cell.

This application further provides a computer-readable storage medium. The computer-readable storage medium stores instructions. When the instructions are run on a computer, the computer is enabled to perform the steps performed by the terminal device in the method shown in FIG. 3.

This application further provides a computer-readable storage medium. The computer-readable storage medium stores instructions. When the instructions are run on a computer, the computer is enabled to perform the steps performed by the network device in the method shown in FIG. 3.

This application further provides a computer program product including instructions. When the computer program product runs on a computer, the computer is enabled to perform the steps performed by the terminal device in the method shown in FIG. 3.

This application further provides a computer program product including instructions. When the computer program product runs on a computer, the computer is enabled to perform the steps performed by the network device in the method shown in FIG. 3.

This application further provides a chip, including a processor. The processor is configured to read and run a computer program stored in a memory, to perform a corresponding operation and/or procedure performed by the terminal device in the signal transmission method according to this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that need/needs to be processed. The processor obtains the data and/or information from the communication interface, and processes the data and/or information. The communication interface may be an input/output interface.

This application further provides a chip, including a processor. The processor is configured to read and run a computer program stored in a memory, to perform a corresponding operation and/or procedure performed by the network device in the signal transmission method according to this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that need/needs to be processed. The processor obtains the data and/or information from the communication interface, and processes the data and/or information. The communication interface may be an input/output interface.

The terms "first", "second", "third", "fourth", and the like (if any) in this application are intended to distinguish between similar objects but do not necessarily indicate a specific order or sequence. It should be understood that data termed in such a way is interchangeable in proper circumstances, so that the embodiments of this application described herein can be implemented in other orders than the order illustrated or described herein. Moreover, the terms "include", "have", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It should be understood that, the processor in the embodiments of this application may be a central processing unit (central processing unit, CPU), or may be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, any conventional processor, or the like.

It should be further understood that the memory in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any other proper types of memories.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

When functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A signal transmission method, comprising:
receiving a first positioning reference signal (PRS) resource set;
receiving a second PRS resource set; and
determining that N first PRS resources in the first PRS resource set and N second PRS resources in the second PRS resource set satisfy a quasi-colocation (QCL) relationship, wherein N is an integer greater than or equal to 1, wherein resource elements (REs) occupied by a first PRS resource in the first PRS resource set and a second PRS resource in the second PRS resource set all or partially overlap each other.

2. The method according to claim 1, wherein the determining that N first PRS resources in the first PRS resource set and N second PRS resources in the second PRS resource set satisfy the QCL relationship comprises at least one of:
determining that PRS resources having a same resource identifier or a same resource index in the N first PRS resources in the first PRS resource set and the N second PRS resources in the second PRS resource set satisfy the QCL relationship;
determining that PRS resources having a same resource position in the N first PRS resources in the first PRS resource set and the N second PRS resources in the second PRS resource set satisfy the QCL relationship; or
determining that PRS resources having a specified QCL relationship in the N first PRS resources in the first PRS resource set and the N second PRS resources in the second PRS resource set satisfy the QCL relationship.

3. The method according to claim 1, wherein the determining that N first PRS resources in the first PRS resource set and N second PRS resources in the second PRS resource set satisfy the QCL relationship comprises:
determining, based on a QCL-related parameter, that the N first PRS resources in the first PRS resource set and the N second PRS resources in the second PRS resource set satisfy the QCL relationship, wherein the QCL-related parameter comprises one or more of the following parameters:
a QCL type, an index of the first PRS resource set, or an index of the second PRS resource set;
a part or all of the QCL-related parameter is preset; or
the part or all of the QCL-related parameter is configured by a network device.

4. The method according to claim 3, wherein the QCL-related parameter further comprises:
indices of the N first PRS resources in the first PRS resource set and indices of the N second PRS resources in the second PRS resource set.

5. The method according to claim 3, wherein in response to the part or all of the QCL-related parameter being configured by the network device, the method further comprises:
receiving a configuration parameter, wherein the configuration parameter comprises the part or all of the QCL-related parameter.

6. The method according to claim 1, wherein
the first PRS resource set comprises M first PRS resources, and the M first PRS resources sequentially correspond to M transmit beams in a one-to-one manner; and
the second PRS resource set comprises M second PRS resources, and the M second PRS resources sequentially correspond to the M transmit beams in a one-to-one manner, wherein M is an integer greater than or equal to N.

7. The method according to claim 3, wherein the first PRS resource in the first PRS resource set and the second PRS resource in the second PRS resource set satisfy the QCL relationship,
wherein the first PRS resource in the first PRS resource set and the second PRS resource in the second PRS resource set satisfying the QCL relationship comprises:
the first PRS resource in the first PRS resource set and the second PRS resource in the second PRS resource set satisfying the QCL relationship is preset; or
the first PRS resource in the first PRS resource set and the second PRS resource in the second PRS resource set satisfy the QCL relationship is determined based on the QCL-related parameter.

8. A signal transmission method, comprising:
determining that N first PRS resources in a first positioning reference signal (PRS) resource set and N second PRS resources in a second PRS resource set satisfy a quasi-colocation (QCL) relationship, wherein N is an integer greater than or equal to 1;
sending the first PRS resource set; and
sending the second PRS resource set,
wherein resource elements (REs) occupied by a first PRS resource in the first PRS resource set and a second PRS resource in the second PRS resource set all or partially overlap each other.

9. The method according to claim 8, wherein the determining that N first PRS resources in the first PRS resource set and N second PRS resources in the second PRS resource set satisfy the QCL relationship comprises at least one of:
determining that PRS resources having a same resource index in the N first PRS resources in the first PRS resource set and the N second PRS resources in the second PRS resource set satisfy the QCL relationship;
determining that PRS resources having a same resource position in the N first PRS resources in the first PRS resource set and the N second PRS resources in the second PRS resource set satisfy the QCL relationship; or
determining that PRS resources having a specified QCL relationship in the N first PRS resources in the first PRS resource set and the N second PRS resources in the second PRS resource set satisfy the QCL relationship.

10. The method according to claim 8, wherein the determining that N first PRS resources in the first PRS resource set and N second PRS resources in the second PRS resource set satisfy the QCL relationship comprises:
determining, based on a QCL-related parameter, that the N first PRS resources in the first PRS resource set and the N second PRS resources in the second PRS resource set satisfy the QCL relationship, wherein the QCL-related parameter comprises one or more of the following parameters:
a QCL type, an index of the first PRS resource set, or an index of the second PRS resource set;
a part or all of the QCL-related parameter is preset; or
the part or all of the QCL-related parameter is configured by a network device.

11. The method according to claim 10, wherein the QCL-related parameter further comprises:
indices of the N first PRS resources in the first PRS resource set and indices of the N second PRS resources in the second PRS resource set.

12. The method according to claim 10, wherein in response to the part or all of the QCL-related parameter being configured by the network device, the method further comprises:
sending a configuration parameter, wherein the configuration parameter comprises the part or all of the QCL-related parameter.

13. The method according to claim 8, wherein
the first PRS resource set comprises M first PRS resources, and the M first PRS resources sequentially correspond to M transmit beams in a one-to-one manner; and
the second PRS resource set comprises M second PRS resources, and the M second PRS resources sequentially correspond to the M transmit beams in a one-to-one manner, wherein M is an integer greater than or equal to N.

14. The method according to claim 10, wherein the first PRS resource in the first PRS resource set and the second PRS resource in the second PRS resource set satisfy the QCL relationship,
wherein the first PRS resource in the first PRS resource set and the second PRS resource in the second PRS resource set satisfy the QCL relationship comprises:
the first PRS resource in the first PRS resource set and the second PRS resource in the second PRS resource set satisfying the QCL relationship is preset; or
the first PRS resource in the first PRS resource set and the second PRS resource in the second PRS resource set satisfy the QCL relationship is determined based on the QCL-related parameter.

15. A signal transmission apparatus, comprising:
a receiver configured to receive a first positioning reference signal (PRS) resource set, wherein
the receiver is further configured to receive a second PRS resource set; and
a processor configured to determine that N first PRS resources in the first PRS resource set and N second PRS resources in the second PRS resource set satisfy a quasi-colocation (QCL) relationship, wherein N is an integer greater than or equal to 1,
wherein resource elements (REs) occupied by a first PRS resource in the first PRS resource set and a second PRS resource in the second PRS resource set all or partially overlap each other.

16. The apparatus according to claim 15, wherein the processor configured to determine that N first PRS resources and N second PRS resources satisfy the (QCL) relationship comprises the processor being configured to:
determine that PRS resources having a same resource index in the N first PRS resources in the first PRS resource set and the N second PRS resources in the second PRS resource set satisfy the QCL relationship;
determine that PRS resources having a same resource position in the N first PRS resources in the first PRS resource set and the N second PRS resources in the second PRS resource set satisfy the QCL relationship; or
determine that PRS resources having a specified QCL relationship in the N first PRS resources in the first PRS resource set and the N second PRS resources in the second PRS resource set satisfy the QCL relationship.

17. The apparatus according to claim 15, wherein the processor configured to determine that N first PRS resources and N second PRS resources satisfy the (QCL) relationship comprises the processor being configured to:
determine, based on a QCL-related parameter, that the N first PRS resources in the first PRS resource set and the N second PRS resources in the second PRS resource set satisfy the QCL relationship, wherein the QCL-related parameter comprises one or more of the following parameters:
a QCL type, an index of the first PRS resource set, or an index of the second PRS resource set;
a part or all of the QCL-related parameter is preset; or
the part or all of the QCL-related parameter is configured by a network device.

18. The apparatus according to claim 17, wherein the QCL-related parameter further comprises:
indices of the N first PRS resources in the first PRS resource set and indices of the N second PRS resources in the second PRS resource set.

19. The apparatus according to claim 15, wherein
the first PRS resource set comprises M first PRS resources, and the M first PRS resources sequentially correspond to M transmit beams in a one-to-one manner; and
the second PRS resource set comprises M second PRS resources, and the M second PRS resources sequentially correspond to the M transmit beams in a one-to-one manner, wherein M is an integer greater than or equal to N.

20. The apparatus according to claim 17, wherein the first PRS resource in the first PRS resource set and the second PRS resource in the second PRS resource set satisfy the QCL relationship,
wherein the first PRS resource in the first PRS resource set and the second PRS resource in the second PRS resource set satisfy the QCL relationship comprises:
the first PRS resource in the first PRS resource set and the second PRS resource in the second PRS resource set satisfying the QCL relationship is preset; or
the first PRS resource in the first PRS resource set and the second PRS resource in the second PRS resource set satisfy the QCL relationship is determined based on the QCL-related parameter.

* * * * *